US010366117B2

(12) United States Patent
Mills et al.

(10) Patent No.: US 10,366,117 B2
(45) Date of Patent: *Jul. 30, 2019

(54) COMPUTER-IMPLEMENTED SYSTEMS AND METHODS FOR TAXONOMY DEVELOPMENT

(71) Applicant: SAS Institute Inc., Cary, NC (US)

(72) Inventors: Bruce Monroe Mills, Cary, NC (US); John Courtney Haws, Durham, NC (US); John Clare Brocklebank, Raleigh, NC (US); Thomas Robert Lehman, Holly Springs, NC (US)

(73) Assignee: SAS INSTITUTE INC., Cary, NC (US)

( * ) Notice: Subject to any disclaimer, the term of this patent is extended or adjusted under 35 U.S.C. 154(b) by 1012 days.

This patent is subject to a terminal disclaimer.

(21) Appl. No.: 14/798,320

(22) Filed: Jul. 13, 2015

(65) Prior Publication Data

US 2015/0317390 A1    Nov. 5, 2015

Related U.S. Application Data

(63) Continuation-in-part of application No. 13/327,949, filed on Dec. 16, 2011, now Pat. No. 9,116,985.

(51) Int. Cl.
| | |
|---|---|
| *G06F 16/36* | (2019.01) |
| *G06F 16/35* | (2019.01) |
| *G06F 16/33* | (2019.01) |

(52) U.S. Cl.
CPC .......... *G06F 16/36* (2019.01); *G06F 16/3334* (2019.01); *G06F 16/35* (2019.01)

(58) Field of Classification Search
CPC ............... G06F 17/30864; G06F 17/27; G06F 17/2795; G06F 17/2785; G06F 16/36; G06F 16/35; G06F 16/3334
See application file for complete search history.

(56) References Cited

U.S. PATENT DOCUMENTS

| | | | |
|---|---|---|---|
| 6,665,681 B1 | 12/2003 | Vogel | |
| 9,116,985 B2 * | 8/2015 | Mills | ................. G06F 17/30731 |

(Continued)

OTHER PUBLICATIONS

Mingqing Hu et al., "Mining and Summarizing Customer Reviews" KDD Aug. 22-25, 2004, pp. 168-177.*

(Continued)

*Primary Examiner* — Robert W Beausoliel, Jr
*Assistant Examiner* — Susan F Rayyan
(74) *Attorney, Agent, or Firm* — Kilpatrick Townsend & Stockton LLP

(57) ABSTRACT

Systems and methods are provided for generating a set of classifiers. A term is identified within a document and a pre-defined threshold distance is determined. A plurality of additional terms in the document are identified, the additional terms being located within the pre-defined threshold distance of the time. A distance between the term and an additional term of the plurality of additional terms is calculated. A corresponding weight for the calculated distance is determined using a proximity weighting scheme. A score for the additional term is calculated using the calculated distance and the corresponding weight. A colocation matrix is generated and a classifier determined using the colocation matrix.

39 Claims, 24 Drawing Sheets

(56) References Cited

U.S. PATENT DOCUMENTS

| | | | |
|---|---|---|---|
| 2004/0064447 A1* | 4/2004 | Simske | G06F 17/30672 |
| 2005/0091038 A1 | 4/2005 | Yi et al. | |
| 2006/0155751 A1* | 7/2006 | Geshwind | G06F 17/3064 |
| 2007/0100779 A1* | 5/2007 | Levy | G06F 17/30722 |
| | | | 705/500 |
| 2008/0215571 A1 | 9/2008 | Huang et al. | |
| 2009/0216524 A1 | 8/2009 | Skubacz et al. | |
| 2010/0161527 A1 | 6/2010 | Sellamanickam et al. | |
| 2010/0262454 A1 | 10/2010 | Sommer et al. | |
| 2011/0040767 A1 | 2/2011 | Kunjithapatham et al. | |
| 2011/0258049 A1* | 10/2011 | Ramer | G06F 17/30867 |
| | | | 705/14.66 |
| 2012/0101808 A1 | 4/2012 | Duong-Van | |
| 2012/0323627 A1 | 12/2012 | Herring et al. | |
| 2013/0103386 A1 | 4/2013 | Zhang et al. | |
| 2013/0159348 A1 | 6/2013 | Mills et al. | |
| 2017/0323645 A1* | 11/2017 | Edara | G06Q 30/0255 |

OTHER PUBLICATIONS

Mingqing Hu et. al., "Mining and Summarizing Customer Reviews" KDD Aug. 22-25, 2004, pp. 168-177. (Year: 2004).*

Deepak et al., "Building Clusters of Related Words: An Unsupervised Approach" Proceedings of the 9$^{th}$ Pacific Rim International Conference on Artificial Intelligence, pp. 474-483 (2006).

Minqing Hu et al., "Mining and Summarizing Customer Reviews" KDD Aug. 22-25, 2004, pp. 168-177.

SAS Enterprise Miner and SAS Text Miner Procedures Reference for SAS 9.1.3 The DMVQ Procedure (Book Excerpt) SAS Institute Inc., Cary NC., (2008).

SAS Taxonomy Automation, SAS Institute Inc. Cary, NC., (2011).

Taboada, et al., "Genre-Based Paragraph Classification for Sentiment Analysis" Proceedings of SIGDIAL 2009: the 10 Annual Meeting of the Special Interest Group in Discourse and Dialogue, Queen Mary University of London, Sep. 2009, pp. 62-70.

Whitelaw, Casey (Language Technology Research Group, University of Sydney, Australia) Garg, Navendu et al. (Linguistic Cognition Laboratory, Department of Computer Science, Illinois Institute of Technology Chicago, Illinois), "Using Appraisal Taxonomies for Sentiment Analysis" 5 pages.

Non-Final Office Action dated Aug. 18, 2014 for U.S. Appl. No. 13/327,949; 19 pages.

Final Office Action dated Jan. 30, 2015 for U.S. Appl. No. 13/327,949; 19 pages.

Notice of Allowance dated Mar. 23, 2015 for U.S. Appl. No. 13/327,949; 8 pages.

* cited by examiner

| | Term | Role | Attribute | Freq | numdocs | Keep | Key | Parent | Parent_id | ispar | sent |
|---|---|---|---|---|---|---|---|---|---|---|---|
| 1 | no | Abbr | Mixed | 13523 | 7890 | Y | 168 | 655947 | 655947 | | N |
| 2 | etc | Abbr | Mixed | 3168 | 2301 | N | 1028 | . | 1028 | | N |
| 3 | co | Abbr | Mixed | 806 | 400 | Y | 2144 | . | 2144 | | N |
| 4 | dr | Abbr | Mixed | 1263 | 715 | Y | 2287 | . | 2287 | | N |
| 5 | mr. | Abbr | Mixed | 3342 | 982 | Y | 3341 | . | 3341 | | N |
| 6 | ca | Abbr | Mixed | 269 | 173 | Y | 4458 | . | 4458 | | N |
| 7 | app | Abbr | Mixed | 2152 | 797 | Y | 5478 | 592677 | 592677 | | N |
| 8 | mph | Abbr | Mixed | 40 | 25 | Y | 7194 | . | 7194 | | N |
| 9 | ipm | Abbr | Mixed | 29 | 10 | Y | 14223 | . | 14223 | | N |
| 10 | mr | Abbr | Mixed | 619 | 456 | Y | 30333 | . | 30333 | | N |

FIG. 11

| ⑫ TERMNUM_ | ⑫ DOCUMENT_ | ⑫ COUNT_ | ⑫ OFFSET_ | ⑫ LENGTH_ | ⑫ order |
|---|---|---|---|---|---|
| 39 | 1 | 4 | 0 | 4 | 1 |
| 40 | 1 | 1 | 5 | 10 | 2 |
| 41 | 1 | 1 | 16 | 5 | 3 |
| 42 | 1 | 2 | 22 | 6 | 4 |
| 43 | 1 | 16 | 29 | 2 | 5 |
| 44 | 1 | 1 | 38 | 7 | 6 |
| 45 | 1 | 3 | 47 | 7 | 7 |
| 46 | 1 | 1 | 55 | 5 | 8 |
| 47 | 1 | 1 | 61 | 3 | 9 |
| 48 | 1 | 1 | 65 | 5 | 10 |
| 49 | 1 | 1 | 71 | 18 | 11 |
| 50 | 1 | 1 | 90 | 9 | 12 |

FIG. 12

| Doc ID | Term | Order |
|---|---|---|
| 1003 | Xcorp | 1 |
| 1003 | has | 2 |
| 1003 | great | 3 |
| 1003 | customer service | 4 |
| ~~1003~~ | ~~customer~~ | ~~#~~ |
| ~~1003~~ | ~~service~~ | ~~$~~ |

*FIG. 13*

MATCH TO FIG. 16B

| | Term | XCorp | Xcorp.com | customer | shoe | company | service |
|---|---|---|---|---|---|---|---|
| 2321 | coupon code | 0.0013116356 | 0.0050283087 | 0.0025310183 | 0.0002881056 | 0.0010697093 | 0.0002912569 |
| 2322 | couponcraze.com | 0 | 0 | 0 | 0.000489693 | 0 | 0 |
| 2323 | coupons | 0.0058928611 | 0.0262347653 | 0.0004964424 | 0.0022604001 | 0 | 0 |
| 2324 | coupons.com | 0 | 0 | 0 | 0 | 0.0121577303 | 0.0038944312 |
| 2325 | courage | 0.0005511188 | 0.0011349936 | 0.0026524799 | 0.0006967652 | 0.0003621834 | 0.0006574273 |
| 2326 | courier | 0.0007992413 | 0 | 0.0008812963 | 0.0005015894 | 0.0007821891 | 0 |
| 2327 | course | 0.0023116356 | 0.001886208 | 0.0021903926 | 0.0026175446 | 0.0018218444 | 0.0020469736 |
| 2328 | court | 0.0011269768 | 0.0018032963 | 0.0003241772 | 0.0013533808 | 0.0007992262 | 0.0007833984 |
| 2329 | courtesy | 0.0049902673 | 0.0134680648 | 0.0004402079 | 0.0022548973 | 0.0020511949 | 0.0003545984 |
| 2330 | cousin | 0.0006448234 | 0.0013184032 | 0.0006320221 | 0.0004496439 | 0.00018869824 | 0.0001272774 |
| 2331 | couture | 0.0138435417 | 0.0045508673 | 0.0020600732 | 0.0057741318 | 0.00043961 65 | 0.0020674994 |
| 2332 | couture.zappos.com | 0.0064449818 | 0.0013790284 | 0.0001652712 | 0.0035744341 | 0 | 0 |

FIG. 15A

| amazon | XCorp.com | business | Smith | brand | culture | tony |
|---|---|---|---|---|---|---|
| 0.002344379 | 0.000241326 | 0.0016480739 | 0 | 0 | 0 | 0 |
| 0 | 0 | 0 | 0 | 0 | 0 | 0 |
| 0.0032188406 | 0 | 0 | 0 | 0 | 0 | 0 |
| 0 | 0 | 0.0055091485 | 0 | 0.0038191122 | 0 | 0 |
| 0 | 0 | 0.004650056 | 0.0007425345 | 0.0006447125 | 0.0108130539 | 0.0019298564 |
| 0 | 0 | 0.010042489 | 0.001069076 | 0 | 0 | 0.0027785419 |
| 0.001634168 | 0.0001976887 | 0.0065730482 | 0.0009928682 | 0.0038916172 | 0.0022157186 | 0.0011059188 |
| 0.0012844972 | 0.000072122 | 0.0017238864 | 0 | 0.0015364946 | 0 | 0.0005110312 |
| 0.00071355566 | 0.002203565 | 0.0220714031 | 0.0010012574 | 0.0062259328 | 0.0002651031 | 0.002428796 |
| 0.0005122393 | 0 | 0.0010802966 | 0 | 0.0004992633 | 0 | 0 |
| 0.0005839183 | 0.0040121725 | 0.0049258618 | 0 | 0.0066160971 | 0.0004881137 | 0.0008518003 |
| 0 | 0.0006618435 | 0.0007533152 | 0 | 0 | 0 | 0 |

MATCH TO FIG. 16A

*FIG. 15B*

| Term | eye | frog's | face | emotion | jewel | Xcorp |
|---|---|---|---|---|---|---|
| corner | 1 | 1 | 1 | 2 | -- | -- |
| portly | 1 | 1 | 1 | 2 | -- | -- |
| complex | 1 | 1 | 1 | 2 | 1 | -- |
| nuanced | 1 | 1 | 1 | 2 | 1 | -- |

| lawn | 1 | 1 | 2 | 0 | 1 | 1 |
|---|---|---|---|---|---|---|
| ornament | 1 | 1 | 2 | 0 | 1 | 1 |
| art | -- | -- | 1 | 1 | 0 | 1 |
| mom | -- | -- | 0 | 2 | 1 | 0 |
| charming | -- | -- | 0 | -- | 1 | 1 |

*FIG. 17*

| Term | eye | frog's | face | emotion | jewel | Xcorp |
|---|---|---|---|---|---|---|
| corner | 1.0 | 1.0 | 0.8 | 1.8 | -- | -- |
| portly | 1.0 | 1.0 | 1.0 | 1.8 | -- | -- |
| complex | 0.8 | 0.8 | 1.0 | 1.8 | 0.6 | -- |
| nuanced | 0.8 | 0.8 | 1.0 | 1.8 | 0.6 | -- |
| lawn | 0.6 | 0.6 | 0.8 | 1.4 | 0.8 | 0.6 |
| ornament | 0.6 | 0.6 | 0.8 | 1.4 | 0.8 | 0.6 |
| art | -- | -- | -- | 0.6 | 1.0 | 0.8 |
| mom | -- | -- | -- | -- | 0.8 | 1.0 |
| charming | -- | -- | -- | -- | 0.6 | 0.8 |

*FIG. 19*

MATCH TO FIG. 21B

| | Term | xcorp | Xcorp.com | customer | shoe | company | service |
|---|---|---|---|---|---|---|---|
| 1 | checkout | 0.00074262 | 0.0039177134 | 0.0037709598 | 0.0026682768 | 0.0003923619 | 0.0061320052 |
| 2 | culture | 0.0110931302 | 0.0033660223 | 0.0042240638 | 0.0010305040 | 0.0054164922 | 0.0036149201 |
| 3 | customer service | 0.006670146 | 0.0027872118 | 0.0062644455 | 0.0014372953 | 0.0036870955 | 0.0047832179 |
| 4 | discount | 0.0017404008 | 0.0016577772 | 0.0013607429 | 0.0065362514 | 0.0012562154 | 0.0013429995 |
| 5 | Smith | 0.0137946289 | 0.011663121 | 0.0017589845 | 0.0012008472 | 0.0026230191 | 0.0015266989 |
| 6 | price | 0.0022504372 | 0.0027956743 | 0.0017566684 | 0.0033905866 | 0.0015048463 | 0.0012881011 |
| 7 | selection | 0.0019519946 | 0.0028906117 | 0.0016725631 | 0.0054632486 | 0.0006762467 | 0.0015081285 |
| 8 | shipping | 0.0036629873 | 0.003441742 | 0.002266781 | 0.0042957731 | 0.0005649441 | 0.0021685746 |
| 9 | variety | 0.0021198414 | 0.0039325838 | 0.002144294 | 0.0048546086 | 0.0025200321 | 0.0041548142 |
| 10 | return policy | 0.0031481572 | 0.0037195436 | 0.0026794435 | 0.0036232186 | 0.0022254321 | 0.0022678958 |
| 11 | n/a | 0.0033333333 | 0.0033333333 | 0.0033333333 | 0.0033333333 | 0.0033333333 | 0.0033333333 |

*FIG. 21A*

| amazon | xcorp.com | business | Smith | brand | culture | tony |
|---|---|---|---|---|---|---|
| 0.0232929939 | 0.0005313578 | 0.0008232332 | 0 | 0.0007644699 | 0.0002260962 | 0 |
| 0.0048480206 | 0.0012204324 | 0.0040077913 | 0.013357109 | 0.0076672065 | 0.1765626784 | 0.011507728 |
| 0.0028860657 | 0.0027947093 | 0.0035546821 | 0.0076132132 | 0.0033312237 | 0.0061526473 | 0.0050704168 |
| 0.0034470463 | 0.0069380308 | 0.0010214076 | 0.0010170587 | 0.0019729019 | 0.0015044751 | 0.0000293031 |
| 0.0046611172 | 0.0040801486 | 0.0035336226 | 0.1160948304 | 0.0021436163 | 0.0088126363 | 0.0794752978 |
| 0.0076491765 | 0.0025525768 | 0.0007153998 | 0.0003674157 | 0.0027905118 | 0.00025693590 | 0.00042196380 |
| 0.0038228083 | 0.0180344102 | 0.0003617646 | 0.00007289090 | 0.0023188716 | 0.00150138780 | 0.00010763050 |
| 0.0050002407 | 0.0062011582 | 0.0007412938 | 0.0003593541 | 0.0005996403 | 0.0006853593 | 0.000282998 |
| 0.0012001863 | 0.0042003251 | 0.0038826669 | 0.0053549496 | 0.0041725831 | 0.0008936329 | 0.0051396164 |
| 0.0031132713 | 0.0031676655 | 0.0022950565 | 0.0002272218 | 0.0017807436 | 0.0020217937 | 0.0011594961 |
| 0.0033333333 | 0.0033333333 | 0.0033333333 | 0.0033333333 | 0.0033333333 | 0.0033333333 | 0.0033333333 |

*FIG. 21B*

MATCH TO FIG. 21A

| Culture (Attribute Seed) | Distance |
|---|---|
| Culture | 0 |
| company culture | 26.172 |
| employee | 40.2444 |
| emphasis | 40.7081 |
| core | 41.857 |
| long term | 42.3004 |
| hire | 42.7003 |
| belief | 44.7886 |
| great company | 45.7944 |
| values | 47.4209 |
| core value | 51.514 |
| return policy | 51.7623 |
| openness | 56.0687 |

*FIG. 22*

| Term | Synonym | Attribute | Similarity |
|---|---|---|---|
| edition | version | Site User Experience | 0.94734 |
| variety | kind | Variety | 0.92821 |
| success | winner | Smith | 0.91657 |
| delivery | post | Shipping | 0.89367 |
| style | fashion | Variety | 0.87936 |
| woman | girl | Selection | 0.87936 |
| shop | outlet | Price | 0.87936 |
| store | magazine | Price | 0.86266 |
| approach | move | Customer Service | 0.86266 |

*FIG. 23*

COMPUTER-IMPLEMENTED SYSTEMS AND METHODS FOR TAXONOMY DEVELOPMENT

CROSS-REFERENCE TO RELATED APPLICATIONS

This application is a Continuation-in-Part application of co-pending U.S. patent application Ser. No. 13/327,949, filed Dec. 16, 2011, entitled "COMPUTER-IMPLEMENTED SYSTEMS AND METHODS FOR TAXONOMY DEVELOPMENT", which is incorporated herein by reference in its entirety.

TECHNICAL FIELD

This document relates generally to document analysis and more particularly to identifying classifiers contained within a collection of documents.

BACKGROUND

Development of a taxonomy involves the assignment of classifiers to attributes of an entity. An attribute is a feature of the entity. For example, where the entity is a company, attributes of the company may include customer service, pricing, and shipping policy. A classifier is a word that is related to an attribute that describes the attribute for a particular entity. Taxonomy development may be used to identify buzz topics, topics that are currently of interest to customers and the public, related to the entity. By identifying areas of interest for the entity, both in volume and sentiment, information about public perception of the entity may be gained and used to select actions that can be taken to benefit the entity.

SUMMARY

In accordance with the teachings herein, systems and methods are provided for generating a set of classifiers. A location for each instance of a topic term in a collection of documents is determined. One or more topic term phrases are identified by parsing words in the collection of documents, where each topic term phrase includes one or more words that appear within a topic threshold distance of a topic term. One or more sentiment terms are identified within each topic term phrase. One or more candidate classifiers are identified by parsing words in the one or more topic term phrases, where each candidate classifier is a word that appears within a sentiment threshold distance of a sentiment term. A colocation matrix is generated, where each candidate classifier is associated with a row, and where the colocation matrix is generated using the locations of the candidate classifiers as they appear within the collection of documents. A seed row is identified, where the seed row is selected from among the plurality of rows, and where the seed row is associated with a particular attribute. Distance metrics are determined by comparing each row of the colocation matrix to the seed row, and a set of classifiers are generated for the particular attribute, where classifiers in the set of classifiers are selected using the distance metrics.

As another example, a system for generating a set of classifiers may include one or more data processors and one or more computer readable mediums encoded with instructions for commanding the one or more data processors to execute a method. In the method, a location for each instance of a topic term in a collection of documents is determined. One or more topic term phrases are identified by parsing words in the collection of documents, where each topic term phrase includes one or more words that appear within a topic threshold distance of a topic term. One or more sentiment terms are identified within each topic term phrase. One or more candidate classifiers are identified by parsing words in the one or more topic term phrases, where each candidate classifier is a word that appears within a sentiment threshold distance of a sentiment term. A colocation matrix is generated, where each candidate classifier is associated with a row, and where the colocation matrix is generated using the locations of the candidate classifiers as they appear within the collection of documents. A seed row is identified, where the seed row is selected from among the plurality of rows, and where the seed row is associated with a particular attribute. Distance metrics are determined by comparing each row of the colocation matrix to the seed row, and a set of classifiers are generated for the particular attribute, where classifiers in the set of classifiers are selected using the distance metrics.

As a further example, a computer-readable medium may be encoded with instructions for commanding one or more data processors to execute a method of generating a set of classifiers. In the method, a location for each instance of a topic term in a collection of documents is determined. One or more topic term phrases are identified by parsing words in the collection of documents, where each topic term phrase includes one or more words that appear within a topic threshold distance of a topic term. One or more sentiment terms are identified within each topic term phrase. One or more candidate classifiers are identified by parsing words in the one or more topic term phrases, where each candidate classifier is a word that appears within a sentiment threshold distance of a sentiment term. A colocation matrix is generated, where each candidate classifier is associated with a row, and where the colocation matrix is generated using the locations of the candidate classifiers as they appear within the collection of documents. A seed row is identified, where the seed row is selected from among the plurality of rows, and where the seed row is associated with a particular attribute. Distance metrics are determined by comparing each row of the colocation matrix to the seed row, and a set of classifiers are generated for the particular attribute, where classifiers in the set of classifiers are selected using the distance metrics.

As another example, a system for generating a set of classifiers may include one or more data processors and one or more non-transitory computer readable mediums containing instructions to cause one or more processors to perform operations. The operations may include identifying a term within a document. The operations may further include determining a pre-defined threshold distance. The operations may further include identifying a plurality of additional terms in the document, wherein the plurality of additional terms are located within the pre-defined threshold distance of the term. The operations may further include calculating a distance between the term and an additional term of the plurality of additional terms. The operations may further include determining a corresponding weight for the calculated distance, wherein determining the corresponding weight uses a proximity weighting scheme. The operations may further include calculating a score for the additional term using the calculated distance and the corresponding weight. The operations may further include generating a colocation matrix including a plurality of rows, wherein the colocation matrix is generated using the term, the plurality of additional terms, and the score. The operations may further include determining a classifier for the document using the colocation matrix.

As another example, a computer-program product, tangibly embodied in a non-transitory machine readable storage medium, may include instructions operable to cause a data processing apparatus to perform operations. The operations may include identifying a term within a document. The operations may further include determining a pre-defined threshold distance. The operations may further include identifying a plurality of additional terms in the document, wherein the plurality of additional terms are located within the pre-defined threshold distance of the term. The operations may further include calculating a distance between the term and an additional term of the plurality of additional terms. The operations may further include determining a corresponding weight for the calculated distance, wherein determining the corresponding weight uses a proximity weighting scheme. The operations may further include calculating a score for the additional term using the calculated distance and the corresponding weight. The operations may further include generating a colocation matrix including a plurality of rows, wherein the colocation matrix is generated using the term, the plurality of additional terms, and the score. The operations may further include determining a classifier for the document using the colocation matrix.

As another example, a method for generating a set of classifiers may include identifying a term within a document. The method may further include determining a pre-defined threshold distance. The method may further include identifying a plurality of additional terms in the document, wherein the plurality of additional terms are located within the pre-defined threshold distance of the term. The method may further include calculating a distance between the term and an additional term of the plurality of additional terms. The method may further include determining a corresponding weight for the calculated distance, wherein determining the corresponding weight uses a proximity weighting scheme. The method may further include calculating a score for the additional term using the calculated distance and the corresponding weight. The method may further include generating a colocation matrix including a plurality of rows, wherein the colocation matrix is generated using the term, the plurality of additional terms, and the score. The method may further include determining a classifier for the document using the colocation matrix.

In accordance with at least one embodiment, the calculated distance corresponds to a number of sentences from the term.

In accordance with at least one embodiment, the proximity weighting scheme includes a decaying weight value, and wherein the decaying weight value decreases as the distance between the term and the additional term increases.

In accordance with at least one embodiment, a system, method, or non-transitory computer program product may further include instructions and/or operations that include sorting the plurality of rows of the colocation matrix to generate an ordered colocation matrix, wherein the sorting is according to a corresponding distance between the additional term and the term, and determining a set of candidate classifiers using the colocation matrix, wherein the classifier is determined from the set of candidate classifiers.

In accordance with at least one embodiment, a system, method, or non-transitory computer program product may further include instructions and/or operations that include standardizing each of the plurality of rows by dividing values in each row by a sum of the values in the row.

In accordance with at least one embodiment, a system, method, or non-transitory computer program product may further include instructions and/or operations that include identifying a seed row of the plurality of rows, wherein the seed row is associated with a particular term within the document; determining a distance metric by comparing rows of the colocation matrix to the seed row using a clustering operation; and generating a set of classifiers for the particular term, wherein the set of classifiers are determined using the distance metrics, and, wherein the classifier is determined from the set of candidate classifiers.

In accordance with at least one embodiment, the distance metric for a particular candidate classifier of the set of classifiers is determined based on a Euclidean distance calculation using values from a row in the colocation matrix and corresponding values in the seed row in the colocation matrix.

In accordance with at least one embodiment, the set of classifiers is provided to a downstream computer for processing.

In accordance with at least one embodiment, the set of classifiers is limited to nouns, verbs, or adjectives.

In accordance with at least one embodiment, a system, method, or non-transitory computer program product may further include instructions and/or operations that include identifying a plurality of other terms within the document; and for an individual term of the plurality of other terms: identify a plurality of other terms that occur within the pre-defined threshold distance of the individual term; calculate a distance measurement between the individual term and a term of the plurality of other terms; determine an associated weight for the distance measurement, wherein determining the associated weight uses the proximity weighting scheme; and calculate a corresponding score for the other term using the distance measurement and the associated weight.

BRIEF DESCRIPTION OF THE FIGURES

FIG. 11 depicts a table data structure generated as part of a text mining operation.

FIG. 12 depicts an offset data structure.

FIG. 13 depicts a text mining data structure where certain word records are replaced by noun group records.

FIGS. 15A and 15B depict an example colocation matrix.

FIG. 17 depicts an example term-by-term matrix.

FIG. 19 depicts an example proximity weighted term-by-term matrix.

FIGS. 21A and 21B depicts a classifier clustering data structure.

FIG. 22 is a table identifying distances between a seed word and a number of candidate classifiers.

FIG. 23 depicts an example operation to determine the similarity between a word selected for the set of classifiers and a synonym to determine whether to include the synonym in the set of classifiers.

DETAILED DESCRIPTION

Figure 1:
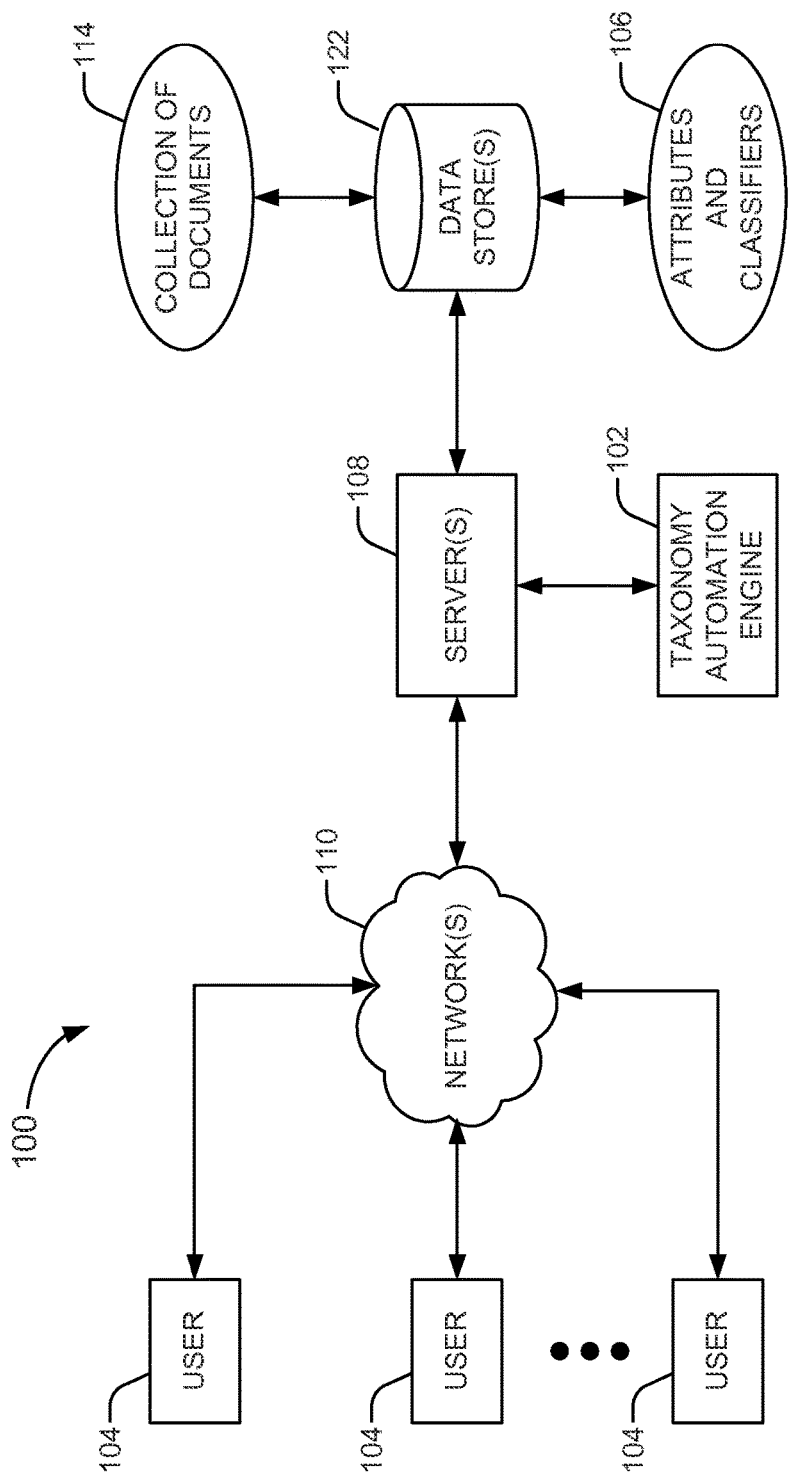
FIG. 1 is a block diagram depicting a computer-implemented taxonomy automation engine.

FIG. 1 is a block diagram depicting a computer-implemented taxonomy automation engine. A taxonomy automation engine 102 assigns classifiers (related words) to appropriate attributes (e.g., categories that form mutually exclusive clusters) through a data driven approach for a given topic or a given term. In social media analytics, taxonomies may be used to identify areas of interest for a topic by volume or sentiment. Once classifiers are identified, further investigation can be performed in the areas of interest and actions can be determined and taken to benefit an entity.

The current method of taxonomy creation is done completely through human scoring. Human scoring is done based on a sample of a text corpus. In the current process, once selecting a sample of the corpus is complete, a linguist reads through the sample of documents and attempts to identify classifiers and map them to attributes. The human scoring is limited to how well the sample represents all of the potential classifiers. Depending on the complexity of the topic and corpus, manual creation of a taxonomy can take significant amounts of effort and time (e.g., over 4 weeks).

Automating taxonomy development via a taxonomy automation engine 102 reduces time of implementation and provides capabilities for searching the entire text corpus. Depending on the size of the corpus, which may range from tens to hundreds of thousands of documents, the automated process can be near instant or take a couple of hours to complete, but the automated processing will be significantly faster than a manual process. The automated process can be further streamlined using grid-processing. The automated approach is data-driven, which helps eliminate human error. The end result is a taxonomy that can be produced quickly and which accurately represents the corpus.

The taxonomy automation engine 102 provides a platform for users 104 to generate a set of classifiers from a collection of documents. A users 104 accesses the taxonomy automation engine 102, which is hosted via one or more servers 108, via one or more networks 110. The one or more servers 108 communicate with one or more data stores 112. The one or more data stores 112 may contain a variety of data that includes the collection of documents 114 as well as attributes and classifiers 106 for an entity.

Figure 2:
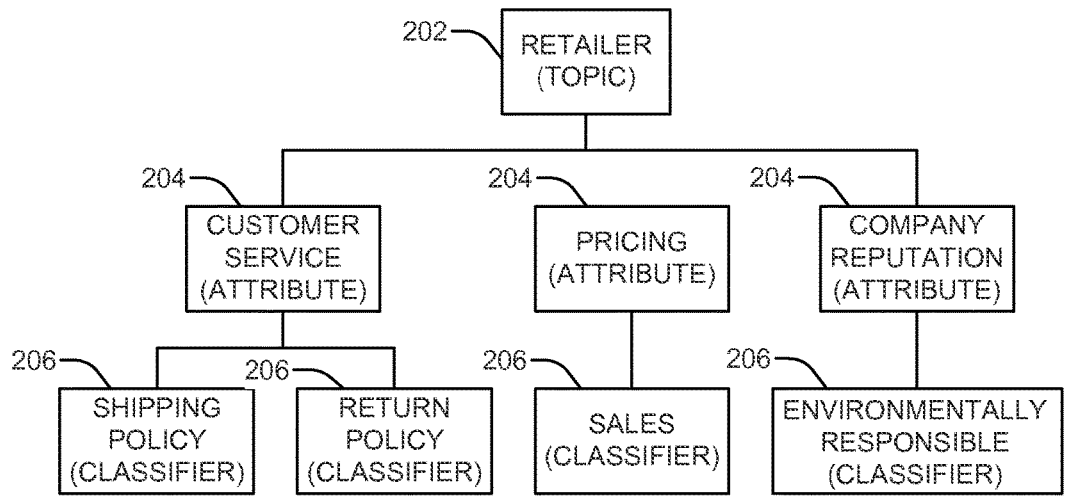
FIG. 2 depicts a taxonomy hierarchy for an entity.

FIG. 2 depicts a taxonomy hierarchy for an entity. The entity 202, a retail company, is displayed at the top level of the hierarchy. A second level of the hierarchy identifies a number of attributes 204 of the company 202. For example, the attributes 204 may be attributes of the company 202 that a marketing department wishes to analyze to identify the level of discussion of those attributes and the sentiment associated with those discussions. A taxonomy automation engine examines a collection of documents to identify classifiers 206 that map to the given attributes, identifying areas of discussion about the attributes 204 in the collection of documents. For example, the analysis depicted in FIG. 2 identifies "environmentally responsible" as a classifier that is related to a company reputation attribute. Example attributes can include a customer service attribute, a product attribute, a product mix attribute, a product price attribute, or a company culture attribute.

Having discovered that environmental responsibility is a topic of discussion related to the company reputation, the company may wish to take action related to that discovered association. If further analysis determines that the sentiment associated with the company's environmental responsibility is positive, then the company may generate advertisements, press releases, or other materials touting the company's environmental responsibility to grasp an opportunity for improving good will and customer loyalty. If further analysis determines that the sentiment associated with the company's environmental responsibility is negative, then the company may take action to reverse that sentiment, such as participating in a community clean-up day, adopting a highway, incorporate recycled materials into a manufactured product, or other action that shows the company acts in an environmentally responsible manner.

The collection of documents discussed herein that are analyzed by the taxonomy automation engine 102 may include documents of a variety of forms. For example the collection of documents may include one or more of: websites, books, magazines, broadreader data (news, blogs, forums), and social media postings. The collection of documents may include large numbers of documents (e.g., more than 1000 documents). For example, the collection of documents may be a compilation of posts made by users of a variety of social media portals (e.g., MySpace, Twitter, Facebook, Youtube), where users enter text and other content to the media portals using an input interface device. With millions of such posts being made each day, sorting through all of the posts to locate the ones about an entity, let alone specific aspects of an entity (e.g., attributes) by hand (e.g., by an analyst) is an unmanageable task. Thus, a substantial need is present for an automated mechanism for generating a taxonomy of classifiers that are related to attributes of an entity.

Figure 3:
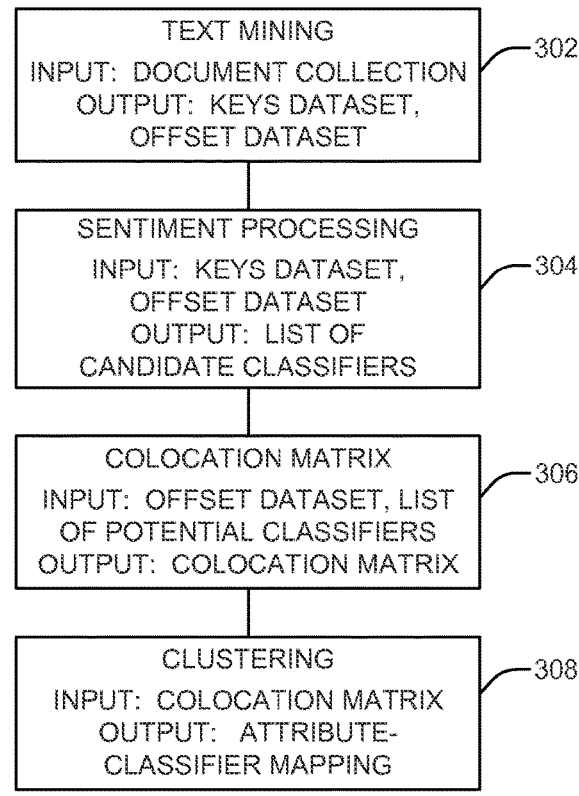
FIG. 3 is a flow diagram depicting a method for generating a set of classifiers from a collection of documents, in accordance with at least one embodiment.

FIG. 3 is a flow diagram depicting a method for generating a set of classifiers from a collection of documents, in accordance with at least one embodiment. At 302, a text mining process is performed, where a collection (corpus) of documents is analyzed to identify the words that are present in the collection of documents along with the locations of those words in the documents. For example, a database (keys database) may be generated that identifies each word that is present in each document in an individual record. Those records may include a number of attributes associated with the word, such as the document that contains the word, the position (offset) of the word in that document, a stemmed form of the word, and a part of speech of the word.

A sentiment processing operation is depicted at 304. Using the database generated at 302, a number of candidate classifiers are identified within the collection of documents. For example, sentiment processing may be implemented as one or more filters to identify candidate classifiers. A first filtering operation may identify topic term phrases. Identifying a topic term phrase may include searching the collection of documents for appearance of a topic term (or variations of a topic term). For example, the topic term may be an entity name, such as a company name. A topic term phrase may be identified as a collection of words within a topic threshold distance of instances of the topic term (e.g., where the entity and topic term are X-Corp, topic term phrases include all words within a threshold distance, 15 words, of X-Corp in the collection of documents).

Sentiment processing may continue by identifying sentiment terms within the identified topic term phrases. Sentiment terms are words that connote human feeling, such as like, love, hate, and dislike. Sentiment words may be identified by comparing words in topic term phrases to words in a sentiment term list. Having located sentiment words within topic term phrases, one or more candidate classifiers can be identified. For example, candidate classifiers may be identified as being a word that appears within a sentiment threshold distance (e.g., five words) of a located sentiment term.

After identifying a set of candidate classifiers, a colocation matrix operation is performed at 306. A colocation matrix is generated, for example, as a table, where each candidate classifier is associated with a row. Using the locations of the candidate classifiers in the collection of documents, such as through the keys database, colocation calculations are made to determine colocation values among each of the candidate classifiers. For example, a colocation value may be based on a number of times one candidate classifier occurs within a colocation proximity (e.g., fifteen words) of another classifier. The colocation matrix indicates the potential relatedness of candidate classifiers, as candidate classifiers that appear near each other often in the collection of documents will tend to be related terms.

Having made calculations for the colocation matrix at 306, a clustering operation is performed at 308 to select classifiers for a particular attribute. The clustering operation identifies words in the colocation matrix, containing the candidate classifiers, that are related to a selected word. In practice, the selected word is often the particular attribute for which one seeks to identify classifiers. The row in the colocation matrix containing the selected word is identified as a seed row. Distance calculations, such as Euclidean distance calculations, are performed between each row in the colocation matrix and the seed row. Rows having small distances likely contain words that are closely related to the particular attribute. Thus, a set of classifiers can be generated by selecting words from rows that have distance metric values that are small, such as those having distance metric values within a threshold distance from the seed row.

Figure 4:
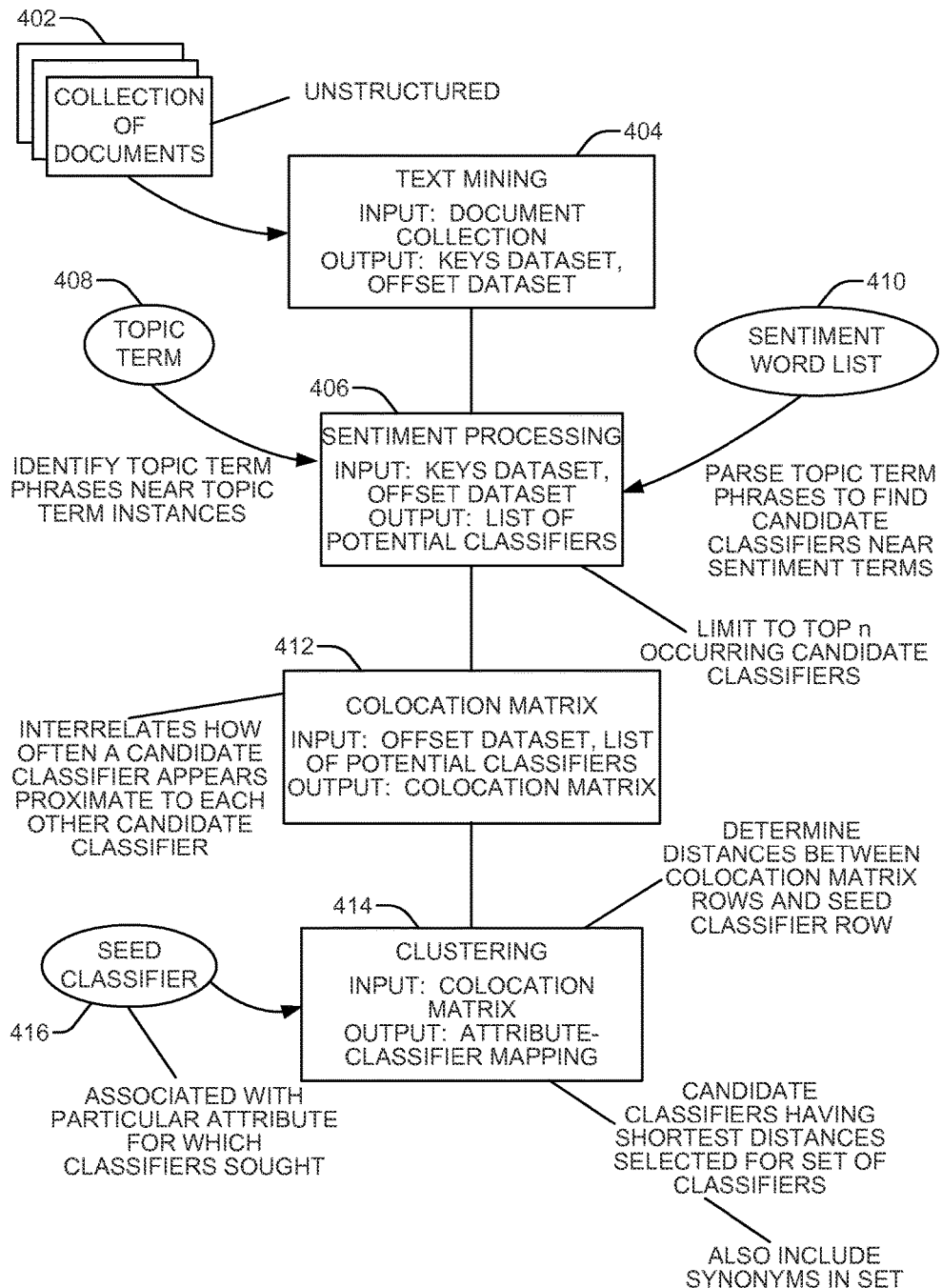
FIG. 4 is a block diagram depicting the generation of a set of classifiers.

FIG. 4 is a block diagram depicting the generation of a set of classifiers. A collection of documents 402 is received. The collection of documents 402 may be unstructured documents, such as raw text, or otherwise formatted. At 404, a text mining operation is performed, wherein a keys data set is generated that includes words appearing in the collection of documents 402 and the location of those words in the documents 402. The data set may include other attributes of the words such as parts of speech and stemmed forms of the words.

At 406, the keys data set is used for performing a sentiment processing operation. In the sentiment processing operation, topic terms 408 are used to identify topic term phrases that include words within a topic threshold distance of the topic term 408 in the collection of documents. The topic term phrases are further searched to find sentiment terms, which can be provided by a sentiment word list 410. The topic term phrases are parsed to find candidate classifiers that are near sentiment terms. For example, candidate classifiers may be identified as all nouns, adjectives, noun groups, and proper nouns appearing within a sentiment threshold distance of a sentiment term found in a topic term phrase.

At 412, a colocation matrix is generated. The colocation matrix identifies how often a candidate classifier appears proximate to each other candidate classifier in the collection of documents 402. The colocation matrix may include a colocation value for each possible pair of candidate classifiers.

At 414, a clustering operation is performed based on a seed classifier 416. The clustering operation identifies candidate classifiers that are particularly related to the particular attribute for which classifiers are sought. The seed classifier 416 is a word associated with the particular attribute and may be the particular attribute itself. The clustering operation determines distances between colocation matrix rows and the seed classifier row. Candidate classifiers having shortest distances are selected for the set of classifiers. If additional classifiers are desired, then the set of classifiers can be expanded by including synonyms for the classifiers selected for the set.

Figure 5:
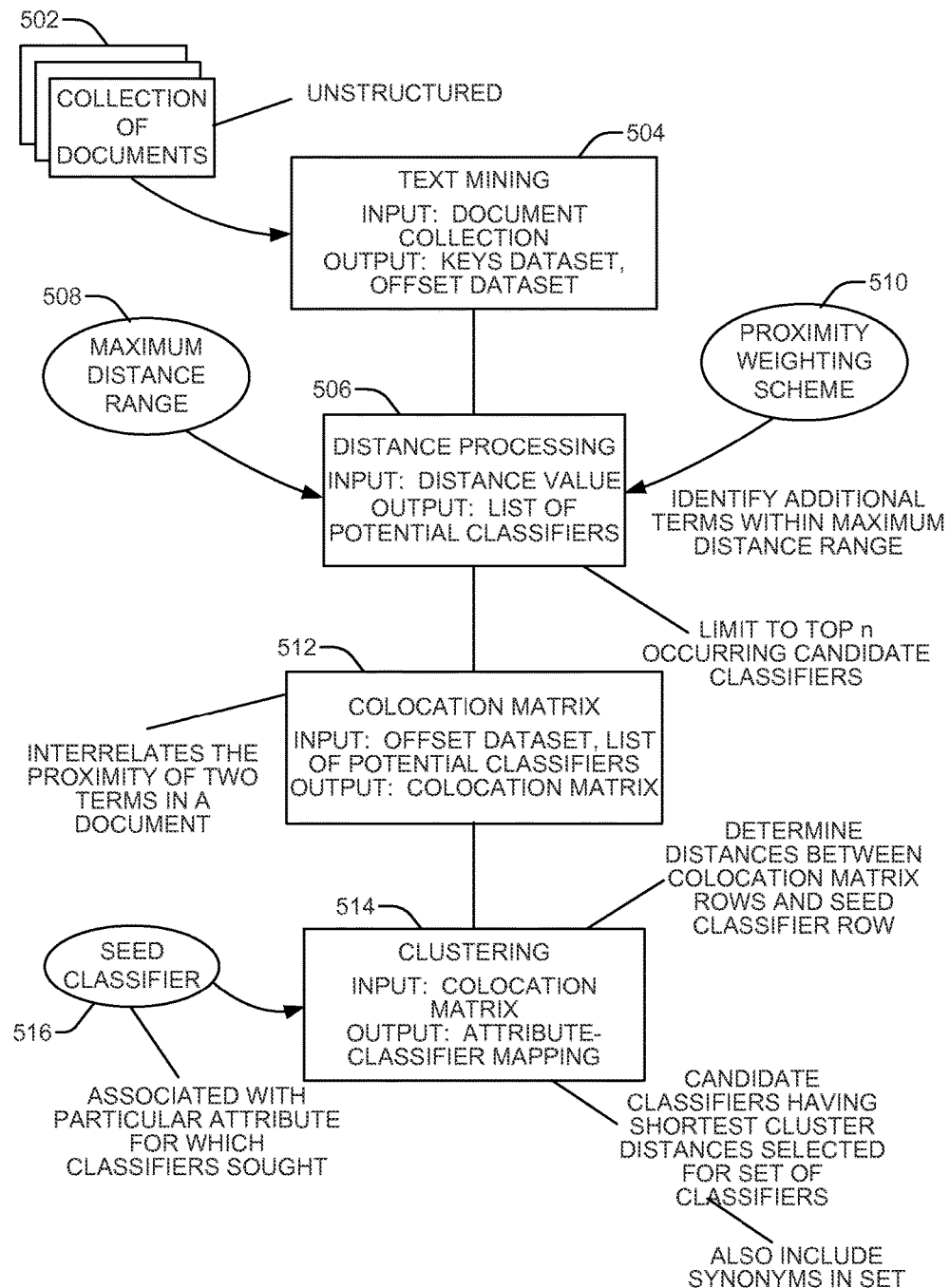
FIG. 5 is a block diagram depicting a process for generation of a set of classifiers using a proximity weighted term-by-term collation matrix.

In at least one embodiment it may be desirable to generate a set of classifiers without utilizing one or more topic terms. For example, a set of classifiers may be generated using a proximity weighting scheme. FIG. 5 is a block diagram depicting a process for generation of a set of classifiers using a proximity weighted term-by-term colocation matrix. A collection of documents 502 is received (e.g., by taxonomy automation engine 102). The collection of documents 502 (e.g., the unstructured documents 402) may be unstructured documents, such as raw text, or otherwise formatted. At 504, a text mining operation is performed, wherein a keys data set is generated that includes terms appearing in the collection of documents 502. An offset data set may be generated (e.g., by taxonomy automation engine 102) that indicates a location (e.g., a sentence number) where the term is located in the collection of documents 502. In at least one example, the offset data set and keys data set may be included in the same data set (e.g., as attributes in a data set) or as separate and distinct data sets.

During text mining operation 504, various terms that are assumed to be unsuitable as classifiers may be discarded (or ignored). For example, terms in the document that are not a noun, a term in a noun group, an adjective, or a proper noun may be discarded from the keys data set. Discarding (or ignoring) such terms enabled a distance processing operation (e.g., the distance processing operation at 506) to perform more efficiently as distances will be calculated only for the remaining terms in the keys data set rather than for every term in the collection of documents 502. The keys data set may include other attributes of the words such as parts of speech and stemmed forms of the words. A "term" or "terms" referred to below are intended to refer to the remaining terms in the keys data set left after the text mining operation 504 has been performed and unsuitable terms have been discarded.

During distance processing operation 506, the keys data set is used (e.g., by taxonomy automation engine 102) to perform the distance processing operation. In the distance processing operation 506, a maximum distance threshold

508 is used to identify a localized area within which to analyze distances with respect to a particular term. For example, the maximum distance threshold may indicate that only terms located within two sentences before or after the sentence in which the term is located may be processed. The range may indicate that only terms located before the term being analyzed may be considered. Similarly, the range may indicate that only terms located after the term being analyzed may be considered. Terms following outside of the maximum distance threshold may not be analyzed. The maximum distance threshold may be defined by an integer, a decimal number, a rule, or any suitable means for defining a threshold value and/or range. A maximum distance threshold may be expressed in any suitable unit of textual distance measurement (e.g., terms, phrases, sentences, paragraphs, pages, chapters, etc.). In at least one example, the maximum distance threshold may indicate that the entire document (e.g., every term in the key data set) is to be analyzed. Such a maximum distance threshold may be inclusive or exclusive with respect to the current sentence in which the current term appears.

As a non-limiting example, distance processing operation 506 may include analyzing a first term in the keys data set and calculate distances for each term determined (e.g., as specified in the offset data set) to be located within two sentences of the first term (e.g., within the first term's sentence, one sentence away from the first term's sentence, or two sentences away from the first term's sentence). All other terms occurring three or more sentences away from the first term may not be analyzed. Each term with the maximum distance threshold may be assigned a score according to the distance between the first term and the scored term. A second term in the keys data set may be analyzed and distances calculated for each term occurring within three sentences of the second term. Such calculations for each term in the key data set (or for a subset of terms in the key data set) may be executed serially, or in parallel. In at least one example, a term may occur multiple times within the maximum distance threshold of the first term. In such cases, each occurrence may be weighted according to a proximity weighting scheme such that a first occurrence of a second term and a second occurrence of the second term may have the same or different weights. In an example in which the first occurrence of the second term is closer to the first term than the second occurrence of the second term, than the second occurrence may, depending on the proximity weighting scheme, be associated with a lower score that the first occurrence of the second term.

Figure 18A:
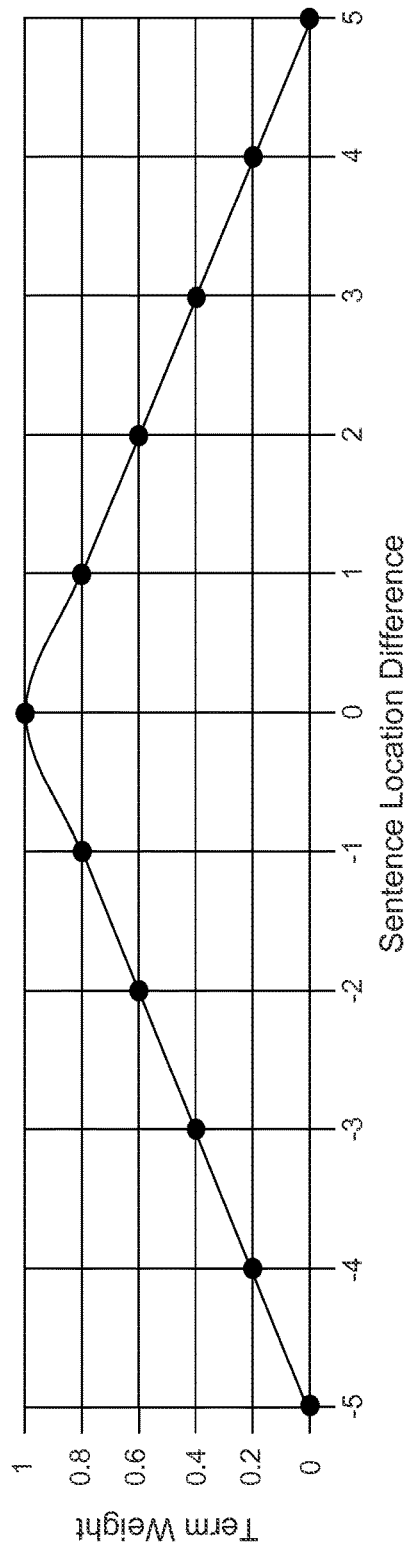
FIGS. 18A and 18B depicts an example proximity weighting scheme.
Figure 18B:
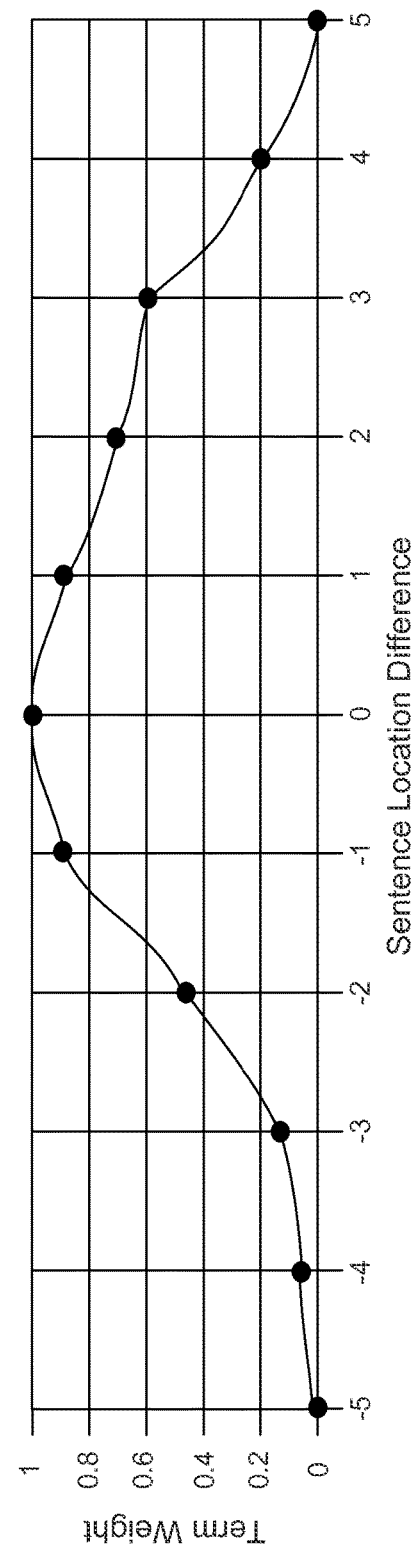

In accordance with at least one embodiment, a proximity weighting scheme 510 may be utilized (e.g., by taxonomy automation engine 102) to assign weights to each score in the keys data set determined using the distance processing operation 506. Example proximity weighting schemes are illustrated in FIGS. 18A and 18B. In general, a proximity weighting scheme assigns various weights to distances between two terms in a document. A proximity weighting scheme may be a linear function, a collection of rules, or any suitable means for assigning a weight value to a distance measurement. A proximity weight scheme may specify that certain types of terms be weighted more heavily than others. For example, nouns may be weighted more heavily than adjectives or vice versa.

In accordance with at least one embodiment, distance processing operation 506 may include adjusting the scores in the keys data set according to the proximity weighting scheme 510. For example, terms that occur closer with respect to a particular term may be assigned higher weights than terms that occur further away from the particular term. The weight may be utilized to adjust the score. Distance processing operation 506 may output the scored keys data set which constitutes a set of potential classifiers for the collection of documents 502. In at least one example, the distance processing operation 506 may limit the set of potential classifiers to a top n candidate classifiers. In at least one example, the top n candidate classifiers may include n candidates that have the highest scores in the set of potential classifiers.

At 512, a colocation matrix is generated. The colocation matrix, in this example, identifies a number of times that a candidate classifier appears proximate to each additional candidate classifier in the collection of documents 502. The colocation matrix may include a colocation value for each possible pair of candidate classifiers. Each instance of a candidate classifier appearing proximate to each additional classifier may be weighted according to the proximity of the terms in the collection of documents 502 as discussed in reference to the distance processing operation 506.

At 514, a clustering operation is performed (e.g., by taxonomy automation engine 102) based on a seed classifier 416. The clustering operation identifies candidate classifiers that are particularly related to the particular attribute for which classifiers are sought. The seed classifier 416 is a word associated with the particular attribute and may be the particular attribute itself. The clustering operation determines distances between colocation matrix rows and the seed classifier row. Candidate classifiers having shortest distances are selected for the set of classifiers. If additional classifiers are desired, then the set of classifiers can be expanded by including synonyms for the classifiers selected for the set.

Figure 6:
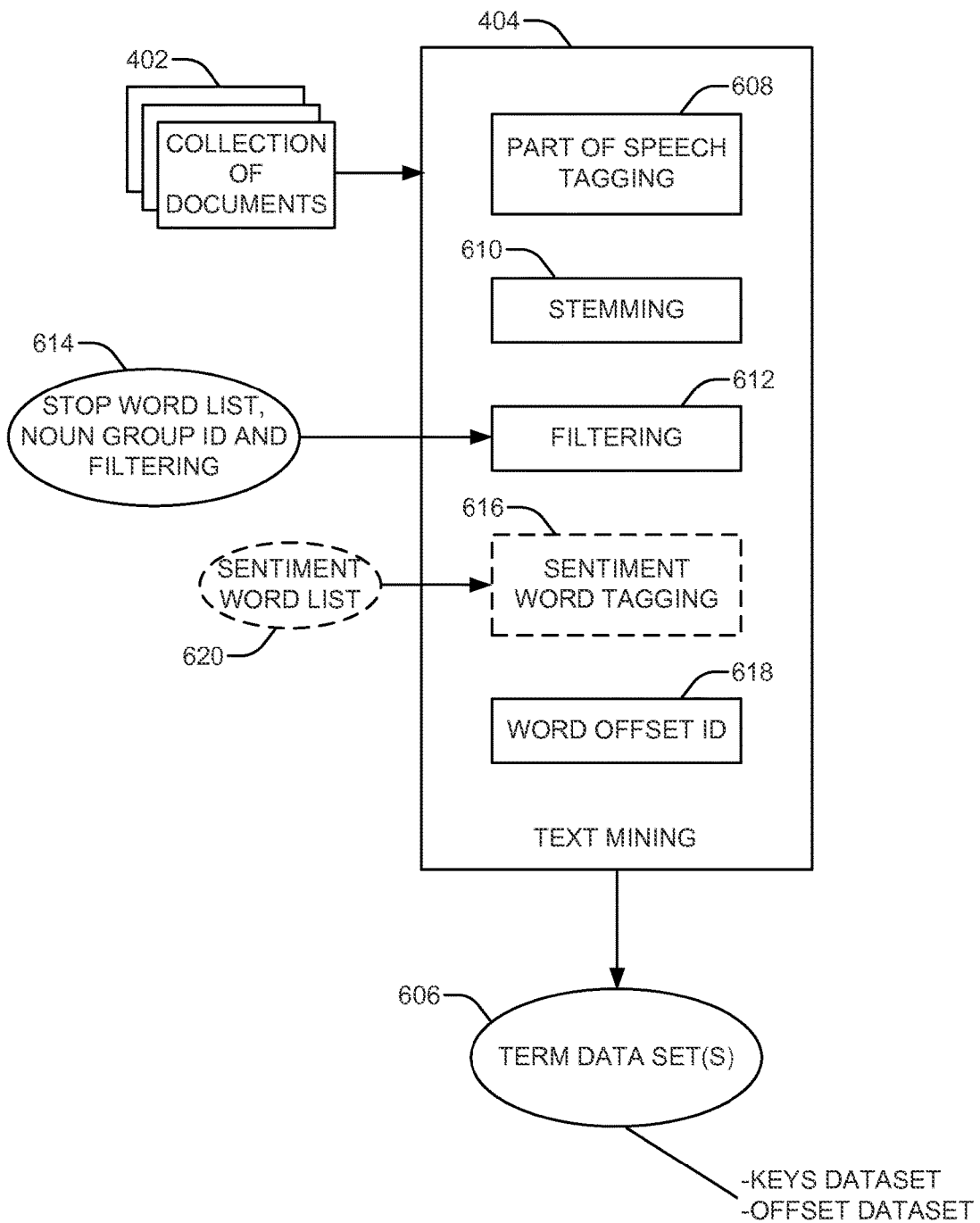
FIG. 6 is a block diagram depicting example operations that may be performed as part of a text mining operation.

FIG. 6 is a block diagram depicting example operations that may be performed as part of a text mining operation. A text mining operation 602 analyzes a collection of documents 604 (e.g., the collection of documents 402 and/or the collection of documents 502) to generate a term data set 606 that contains words in the collection of documents 604 and the location of those words in the collection of documents 604 (offset) in one or more data sets. The text mining operation may include part of speech tagging 608, where the rows of the term data set include a column identifying a part of speech associated with each word (e.g., noun, verb, adjective, adverb, preposition, or article).

A stemming operation may be performed at 610. A stemming operation seeks to identify a root word of a word in the collection of documents, such as by removing endings (e.g. -ed, -ing) and translating words to present tense. The term data set 606 may include only the stemmed version of a word, or the stemmed version may be included as an attribute in a word record.

At 612, filtering may be performed. Filtering may include removing certain words 614 from the term data set 606 that are deemed as unlikely to be relevant to identification of classifiers. For example, articles and conjunctions may be deemed to be of lesser value and are removed from the term data set 606 to speed downstream processing. The filtering operation 612 may further include noun group filtering, where related nouns that appear together in the collection of documents 604 are combined into single records in the term data set 606. For example, the noun group "baseball player" may have its component entries in the term data set 606 combined into a single row record.

In at least one embodiment, at 616, sentiment words in the collection of documents 604 may optionally be tagged in the term data set 606. In examples that utilize a proximity weighting scheme, sentiment word processing is unnecessary. Sentiment words are words that represent human emotion. Sentiment words in the collection of documents 604 may be identified using a sentiment word list 618 that includes a number of known sentiment words. Sentiment words in the list 618 may be compared to words, or stemmed versions of words, in the collection of documents 604. When a sentiment word is located, a flag for that word may be set in the term data set identifying the word as a sentiment word.

Text mining 602 may also include incorporating a word offset 620 in the records of the term data set 606. A word offset 620 identifies which document from the collection of documents 604 a word in a term data set 606 record appears, as well as the position of appearance (e.g., $187^{th}$ word in document 20) in that document.

Figure 7:
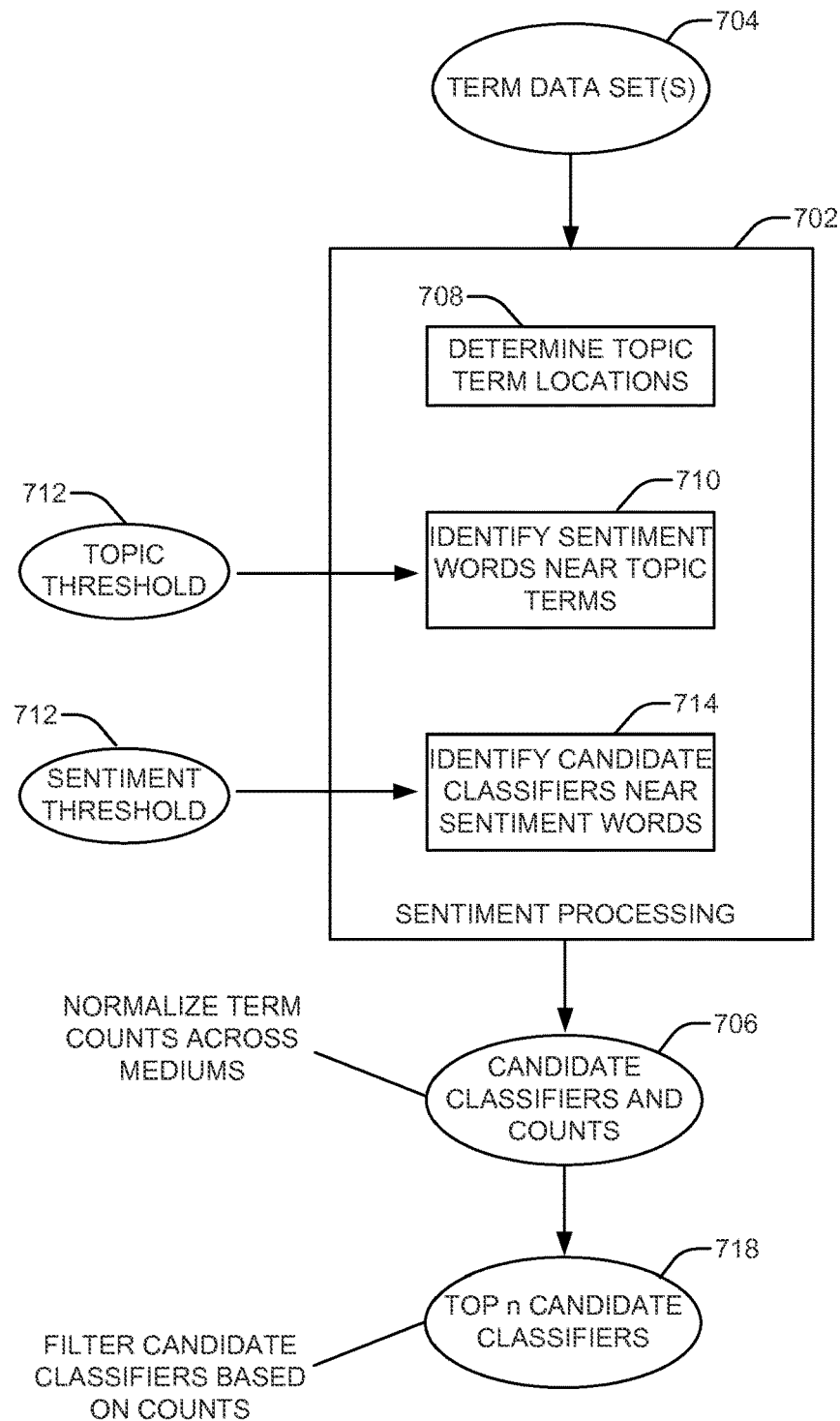
FIG. 7 is a block diagram depicting an example sentiment processing operation.

FIG. 7 is a block diagram depicting an example sentiment processing operation. Sentiment processing 702 uses a term data set 704 to identify candidate classifiers 706 that may include counts of the number of appearances of those candidate classifiers. At 708, a location of topic terms may be determined. A topic term is used to filter the collection of documents in an attempt to locate candidate classifiers that are related to the topic of interest. For example, when a taxonomy is being generated for a person, the topic term may be that person's last name. At 710, sentiment words are identified near topic terms. For example, topic term phrases may be designated as words within a topic threshold 712 distance from topic terms located at 708. At 714, candidate classifiers may be identified that appear near sentiment words. For example, candidate classifiers may be identified as nouns or adjectives that appear within a sentiment threshold 716 number of words of sentiment words found in topic term phrases. The candidate classifiers 706 and other data, such as the number of times a candidate classifier is identified as such, are an output from the sentiment processing 702.

Additional processing may include normalization of candidate classifier counts across different mediums of documents. For example, if a candidate classifier appears often in one type of document media (e.g., social media postings), but very seldom in another document media (e.g., magazine articles), it may be beneficial to normalize the count of that candidate classifier so that the overrepresentation in the one type of document media does not skew the count. Further processing may filter the candidate classifiers 706 to limit the set of candidate classifiers to the top n candidate classifiers 718 (e.g., the top 300 candidate classifiers by count).

Figure 8:
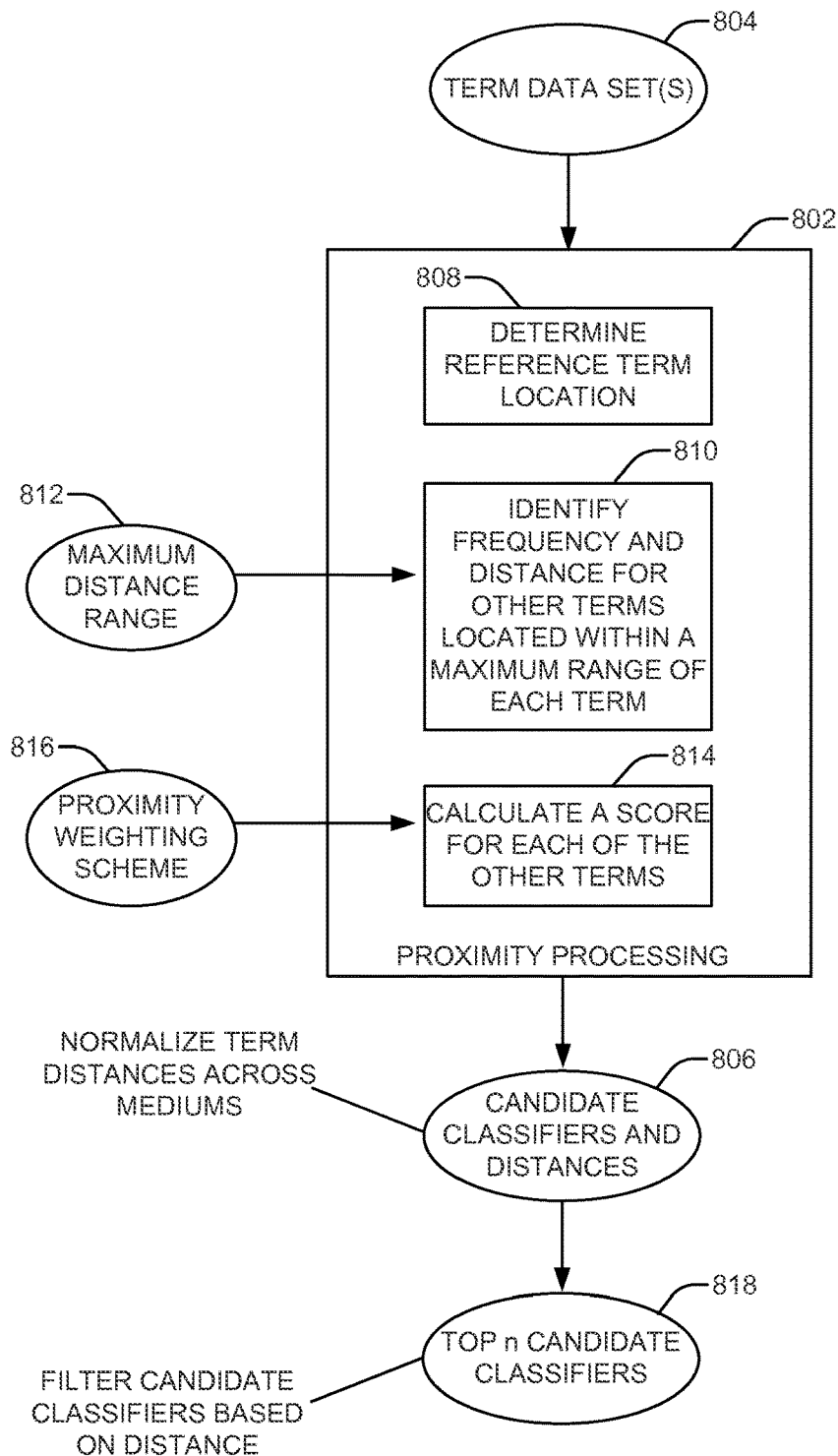
FIG. 8 is a block diagram depicting an example of proximity processing operation.

FIG. 8 is a block diagram depicting an example of proximity processing operation. Proximity processing 802 uses a term data set 804 (e.g., the keys data set discussed in connection with FIG. 5) to identify candidate classifiers 806. Distance measurements of the appearances of those candidate classifiers 806 with respect to a term of the term data set 804 may be determined according to FIG. 8. For example, at 808, a location of a term (e.g., a term used as a frame of reference, hereinafter referred to as a "reference term") of the term data set 804 may be determined. A reference term is used to filter the collection of documents (e.g., collection of documents 502) in an attempt to locate candidate classifiers 806 that are within a threshold distance of the reference term. For example, when a taxonomy is being generated using a sentence threshold of, for example, three sentences, a term of the term data set 804 may be selected. The selected term may be used as a reference term and terms in the term data set 804 that are located outside of three sentences before or after the reference term may be ignored or discarded. At 810, a number of instances that a term is located within the maximum distance threshold of the reference term and corresponding distances for each instance may be calculated. Such calculations may be performed recursively (in parallel or serially) for each term of the term data set 804, or for a portion of the terms of the term data set 804. Terms that occur within the maximum distance threshold may be added to a candidate classifier set for the reference term. The candidate classifier set, in some examples, may include a row in a term-by-term matrix. At 814, a score (e.g., a count) of each of the candidate classifier set may be calculated (e.g., by the taxonomy automation engine 102). The score may be weighted according to a proximity weighting scheme at 816 such that terms occurring further away from a reference term are assigned lower scores than terms occurring closer to the reference term.

Additional processing may include normalization of candidate classifier scores across different mediums of documents. For example, if a candidate classifier often appears close (e.g., within the maximum distance threshold) to the reference term in one type of document media (e.g., social media postings), but very seldom that close in another document media (e.g., magazine articles), it may be beneficial to normalize the distances of that candidate classifier so that the overrepresentation of the distances in the one type of document media does not skew the overall distance calculations. Further processing may filter the candidate classifiers 806 to limit the set of candidate classifiers to the top n candidate classifiers 818 (e.g., the top 300 candidate classifiers by distance).

Figure 9:
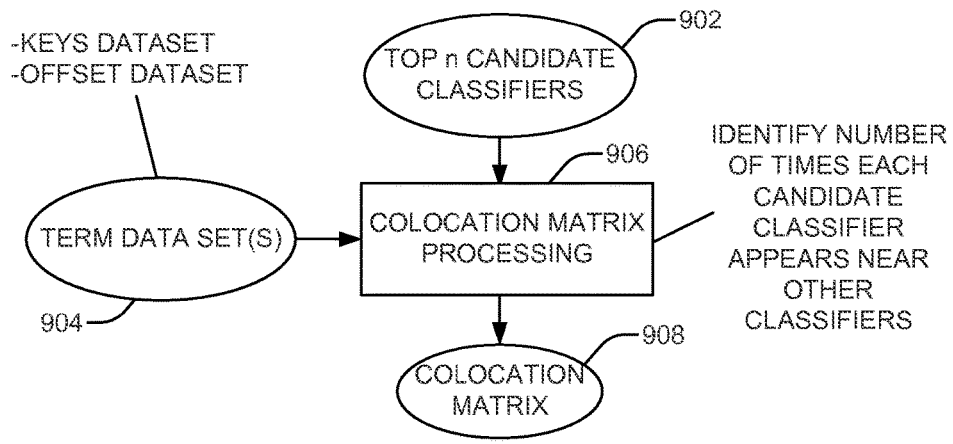
FIG. 9 is a block diagram depicting colocation matrix processing.

FIG. 9 is a block diagram depicting colocation matrix processing. The list 902 of the top n (e.g., 300) candidate classifiers is utilized along with the term data set 904 that includes the words from the collection of documents (e.g., the collection of documents 402 or the collection of documents 502) and their locations 906 to generate a colocation matrix 908. The colocation matrix 908 identifies a frequency that one of the top n candidate classifiers 902 appear near (e.g., within a colocation threshold distance) of another of the top n candidate classifiers (in some implementations the colocation threshold distance is equal to the topic threshold distance). Thus, the colocation matrix 908 can be manifest as an n×n matrix having a value in each cell corresponding to the number of times a pair of candidate classifiers 902 appear within the colocation threshold distance. The values in a column of the colocation matrix 908 may be standardized by dividing the values in that column by the frequency of the associated candidate classifier. Such an operation can balance for variations in frequency among the top n candidate classifiers 902. Rows can also be standardized by dividing values in each row by the sum of the values in the row so that the values in the colocation matrix 908 range from 0 to 1, where the results in a row sum to 1.

Figure 10:
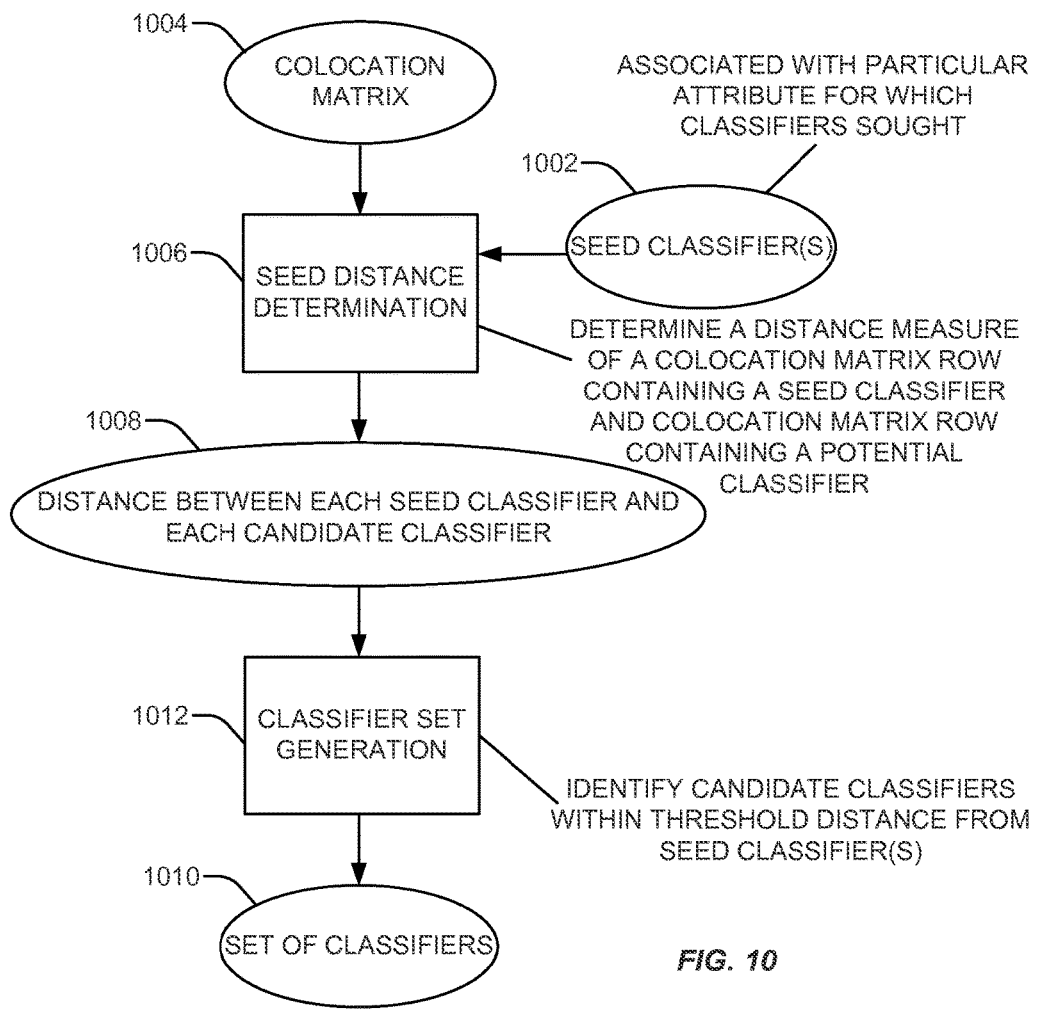
FIG. 10 is a block diagram depicting a clustering operation of identifying a set of classifiers.

FIG. 10 is a block diagram depicting a clustering operation of identifying a set of classifiers. A seed classifier 1002 is selected at 1002. The seed classifier is associated with the particular attribute for which classifiers are sought. The seed classifier corresponds with one of the rows of the colocation matrix 1004. The seed classifier may be the particular attribute itself or a similar or related word. At 1006, a seed distance determination 1008 is made between each row in the colocation matrix and the seed row associated with the seed classifier. The seed distance determination 1006 may be made using a variety of methods including a Euclidean distance calculation between the values of the seed row and a row in the colocation matrix 1004. For example, for a particular row in the colocation matrix, the distance metric may be calculated as the square root of the sum of the squares of the differences between each of the attributes of the seed row and the particular colocation matrix row:

Distance=sqrt((seed row attribute$_1$–particular colocation row attribute$_1$)$^2$+(seed row attribute$_2$–particular colocation row attribute$_2$)$^2$+ . . . +(seed row attribute$_n$–particular colocation row attribute$_n$)$^2$)

Based on the distance metrics 1008 calculated between the seed row 1002 and the other rows in the colocation matrix 1004, a set of classifiers 1010 is generated at 1012. For example, candidate classifiers whose rows are determined to be within a classifier threshold distance of the seed classifier row may be included in the set of classifiers 1010.

A number of data structures may be utilized in a process of generating a set of classifiers. FIG. 11 depicts a table data structure generated as part of a text mining operation. The depicted data set includes a first column labeled Term that contains an instance of a word found in the collection of documents. A role column identifies a part of speech associated with the word. The depicted words in the table of FIG. 11 are labeled as abbreviations. A frequency column identifies the number of times the word appears in the collection of documents, and a numdocs column identifies the number of documents in the collection of documents in which the word appears. The keep column notes whether the row should be retained. For example, if the word appears on a stop list, then that row may have a No value in the keep field, where such rows are removed from the table for future processing. Other columns may include such data as references to other word records, such as parent or child records, where stems of words may be associated with actual forms of appearance via the references.

FIG. 12 depicts an offset data structure. An offset data structure identifies the position of words, such as those depicted in FIG. 11 in different documents in the collection of documents. A term number field links a record in the offset data structure with a word in the text mining data structure of FIG. 9. A document field identifies the document in which a word appears, a count term identifies a number of times the word appears, and an offset identifies which number word in the document that the word referenced in the row appears (e.g., the 103$^{rd}$ word of the document). A length identifies the length of the word in the sentence (this may be different than the length of the word in the table of FIG. 9 if the table of FIG. 9 contains only stemmed versions of words).

FIG. 13 depicts a text mining data structure where certain word records are replaced by noun group records. Originally, the data structure included the words: XCorp, has, great, customer, service. Analysis shows that customer and service are nouns appearing adjacent in a document, making them a possible noun group. When analysis deems customer and service a noun group, the individual word records for customer and service are removed from the data structure and are replaced by a customer service noun group record. The noun group can then be treated as a single word for subsequent operations involved in generating a set of classifiers.

Figure 14:
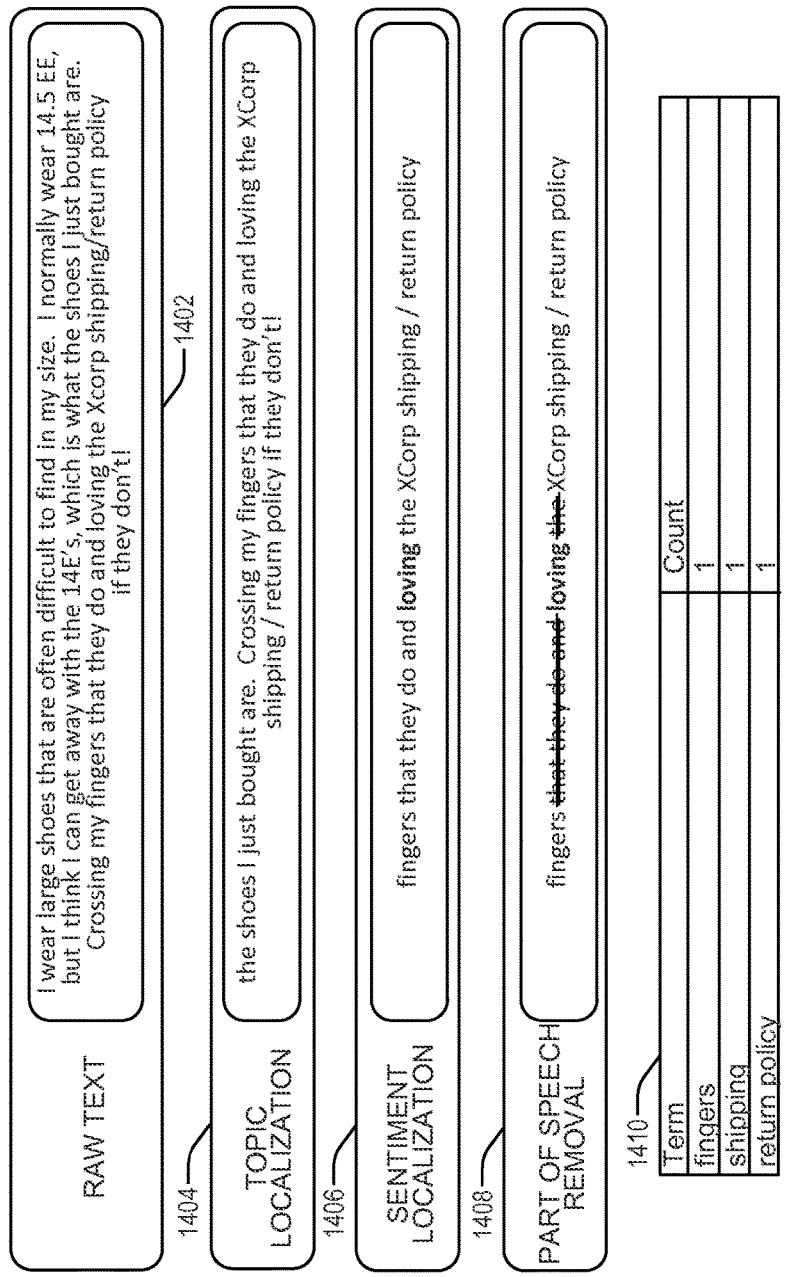
FIG. 14 depicts example operations for identifying candidate classifiers in a portion of text.

FIG. 14 depicts example operations for identifying candidate classifiers in a portion of text. The raw text depicted at 1402 may be all or part of a document in a collection of documents, such as a social media site posting. In this example, XCorp is selected as the topic term. A topic localization operation 1404 identifies a topic term phrase that includes the words in the raw text that are within 15 words of the topic term, XCorp. The topic term phrase is truncated at the right side based on the end of the document after the word "don't!"

A sentiment location operation at 1406 searches for sentiment words in the topic term phrase. Sentiment words to be searched for in the topic term phrase may be accessed from a sentiment term list, table, or other data structure. Words that appear within a five word sentiment threshold of a sentiment word located in a topic term phrase are deemed available for candidate classifier selection. At 1408, words of certain parts of speech of speech that are deemed unlikely to make good classifiers (e.g., verbs, articles, conjunctions) are removed from consideration. The remaining words (e.g., nouns and adjectives) are included in a table at 1410 of candidate classifiers. The table 1410 includes words identified as candidate classifiers after the process of 1402, 1404, 1406, and 1410 and the number of times those words are identified as candidate classifiers across the collection of documents.

FIGS. 15A and 15B depicts an example colocation matrix. The colocation includes a value in each candidate classifier row identifying a frequency with which another candidate classifier (one identified in each column) appears within a colocation threshold number of words of the candidate classifier of that row. Such a value may be determined using an offset data structure that identifies locations of the candidate classifiers on the collection of documents. The frequencies may be standardized by column by dividing values in a column by the frequency of the column candidate classifiers. The frequencies may also be standardized by row by dividing values by the total of the row, so that the sum of all colocation matrix values for a row equals one. The colocation matrix may then be used for identifying classifiers for a number of seed terms, and the colocation can be reused for multiple classifier identifying operations for different attributes of interest.

Figure 16:
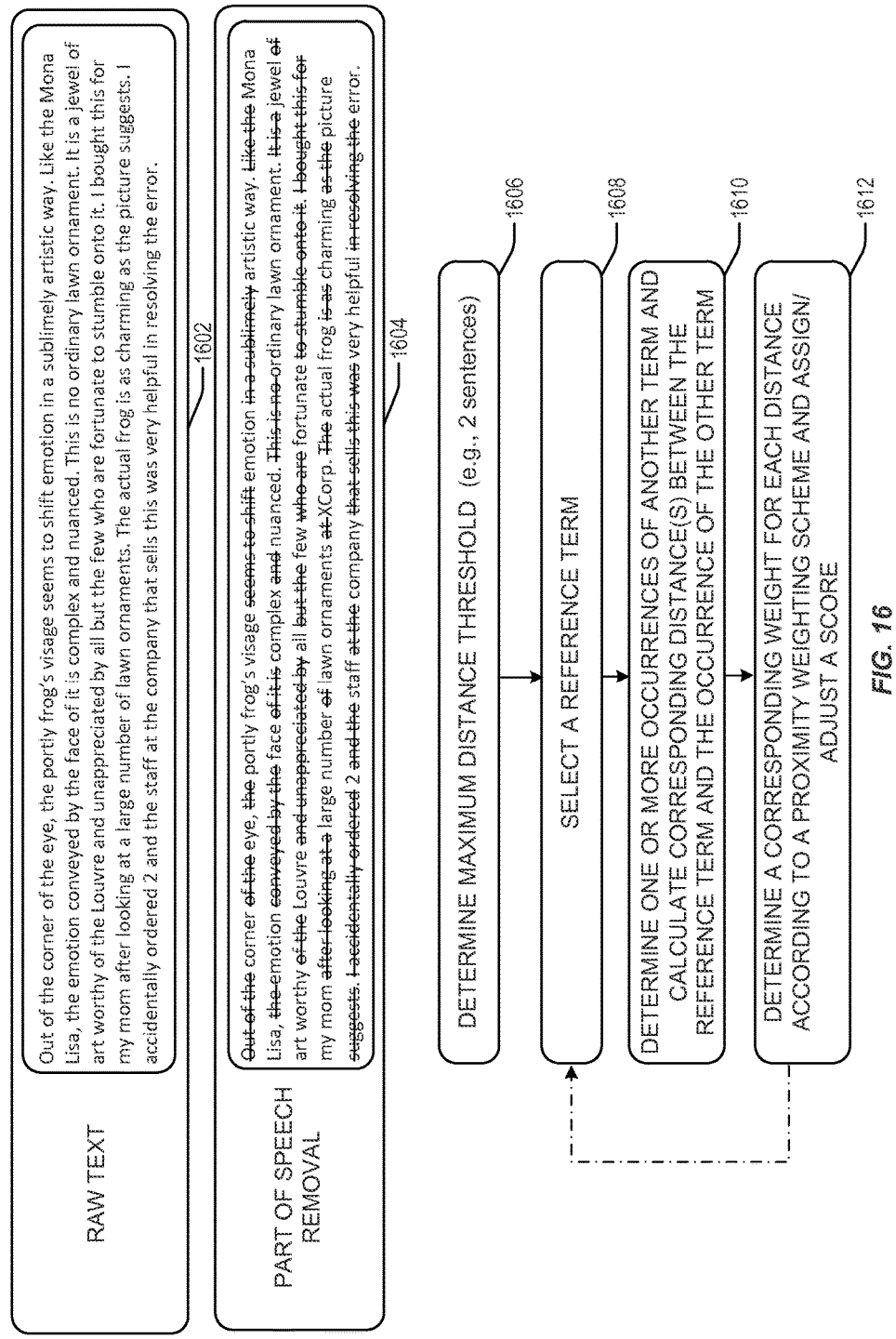
FIG. 16 depicts example operations for identifying candidate classifiers in a portion of text using proximity-weighted distances between terms.

FIG. 16 depicts example operations for identifying candidate classifiers in a portion of text using proximity-weighted distances between terms. The raw text depicted at 1602 may be all or part of a document in a collection of documents (e.g., the collection of documents 402 or and/or collection of documents 502), such as a product review posting. At 1604, words of certain parts of speech that are deemed unlikely to make good classifiers (e.g., verbs, articles, conjunctions, etc.) are removed from consideration. The remaining words (e.g., nouns, noun groups, and adjectives) may be included in a data set. As a non-limiting example, the data set in the example illustrated in FIG. 16 may include the terms "corner," "eye," "portly," "frog's," "visage," "emotion," "artistic," "way," "Mona," "Lisa," "emotion," "face," "complex," "nuanced," "ordinary," "lawn," "ornament," "jewel," "art," "worth," "Louvre," "all," "few," "fortunate," "my," "mom," "large," "number," "lawn," "ornaments," "XCorp," "actual," "frog," "charming," "picture," "2," "staff," "company," "very," "helpful," and "error."

A maximum distance threshold may be determined at 1606 (e.g., by taxonomy automation engine 102). As discussed in connection with FIG. 5, a maximum distance threshold may be used to identify a localized area within which to analyze distances with respect to a particular term. In the example illustrated in FIG. 16, the maximum distance threshold equals two sentences. Such a threshold may be pre-defined, or user-defined. If pre-defined, taxonomy automation engine 102 may access stored data (e.g., configuration data) that specifies the maximum distance threshold. If user-defined, taxonomy automation engine 102 may be configured to receive user information that defines such a maximum distance threshold. In at least some example, a minimum distance threshold may be specified that is utilized in a similar fashion as the maximum distance threshold, although with respect to the minimum distance threshold, terms that occur less than a threshold distance than the minimum distance threshold may be ignored and/or discarded.

In accordance with at least one embodiment, at any suitable time during the process described in FIG. 16, taxonomy automation engine 102 (e.g., operating on a server device) may send a request for (or otherwise obtain) maximum (and/or minimum) distance threshold specification. Such a request may be received by a computing device (e.g., a client device communicatively linked to the server device via a network). In at least one example, the user may enter a maximum (and/or a minimum) distance threshold via the client device. Additionally, the user may enter further information regarding the maximum (and/or minimum) distance threshold such as whether to included words occurring before and/or after a reference term. For example, a user may indicate with the maximum distance threshold (or with information related to the maximum distance threshold) that only words that occur within three sentences following the reference term may be considered. The maximum (and/or minimum) distance threshold may be transmitted the computing device and received by the taxonomy automation engine 102. Upon receipt, or at any suitable time, taxonomy automation engine 102 may store the user-defined maximum (and/or minimum) distance threshold for later use.

In at least one example, a reference term may be selected at 1608. As a non-limiting example, "corner" may be selected as the first reference term from the data set, although the taxonomy automation engine 102 may process the terms in the data set in any suitable order. In accordance with at least one embodiment, an occurrence of one or more other terms in the document may be determined (see the term-by-term matrix of FIG. 17 depicting corresponding occurrences between terms) and corresponding distances between the reference term and the other terms may be calculated at 1610 (illustrated later in FIG. 19). For example, "emotion" occurs twice within a distance of two sentences with respect to the reference term "corner." The first occurrence of "emotion" occurs one sentence away and a second occurrence of "emotion" occurs two sentences away from the reference term. Taxonomy automation engine 102, given a maximum distance threshold of two sentences, may ignore any and all terms falling outside the maximum distance threshold (two sentences, before or after, including the sentence in which "corner" is found) of the term "corner" as illustrated in FIG. 16. Alternatively, each distance may be determined between the reference term "corner" and each and every remaining term in the data set. The taxonomy automation engine 102 may discard, or otherwise ignore, calculations for terms that fall outside the maximum distance threshold of two sentences from the reference word.

At 1612, a corresponding weight may be determined for each distance according to a proximity weighting scheme (e.g., the proximity weighting scheme of FIG. 18A) and a score may be assigned/adjusted. As discussed above, in connection with FIG. 5 a proximity weighting scheme (e.g., the proximity weighting scheme 510) may be utilized (e.g., by taxonomy automation engine 102) to assign weights to each score in the data set or to a portion of the scores in the data set. Such a proximity weighting scheme may specify, for example, that terms occurring in the same sentence as the reference term are weighted more heavily than terms that do not occur in the same sentence as the reference term. Additionally, the proximity weighting scheme may have decaying weights associated with terms as the distance between the term and the reference term increases. Some example proximity weighting schemes are discussed later, in connection with FIGS. 18A and 18B.

In the ongoing example, the first occurrence of "emotion" occurs one sentence away from the reference term "corner." Thus, according to the proximity weighting scheme of FIG. 18A, the occurrence may be weighted by 0.8. In a non-limiting example, consider that an a single occurrence of a term within the maximum distance threshold of the reference term may receive an initial score of "1." In such an example, the initial score can be weighted by 0.8 to provide an adjusted score of 0.8 (1×0.8) to represent the first occurrence of "emotion." The second occurrence of "emotion" occurs two sentence away from the reference term "corner." Again, assuming an initial score of "1" for the second occurrence, the initial score for the second occurrence can be weighted by 0.6 in accordance with the proximity weighting scheme of 18A. Thus the initial score cam be adjusted to 0.6 (1×0.6) to represent the first occurrence of "emotion" with respect to the reference term "corner." The scores may be stored separately in a term-by-term matrix, or the scores may be combined. For example, the score for the first occurrence (0.8) may be added to the score for the second occurrence (0.6) to produce an overall score of 1.4 (0.8+0.6) for the term "emotion," with respect to a reference term "corner."

When processing occurrences of terms and corresponding distances between terms, taxonomy automation engine 102 may process each term calculation serially, or in parallel. In some examples, a number of occurrences (e.g., a count, a frequency, etc.) and corresponding distances of those occurrences may be stored in the term-by term matrix. In such examples, the corresponding weights of each occurrence/distance may be determined at a later time (e.g., as a batch operation).

In at least one embodiment, a determination of an occurrence of a term within the maximum distance threshold of the reference term may trigger a calculation of a distance measurement between the reference term and the occurrence of the term. Similarly, the calculation of the distance measurement may trigger a determination of a weight for the distance measurement. The determination of the weight of the distance may trigger an assignment/adjustment of a score for the occurrence. In other words, each term may be processed individually with steps 1608-1612 being repeated for each term pair being considered in the data set. For example, the taxonomy automation engine 102 may continue to a next reference term (or some other term in the data set), for example, "eye," and repeat the calculations at 1610 and 1612 in a similar manner as described above with respect to the reference term "corner." The process described in FIG. 16 may continue recursively (iteratively) until distances are calculated between each term and every other term, or some portion of the same. In some examples, processing may continue for a pre-defined period of time, or until a user interrupts the calculation process, or the like.

FIG. 17 depicts an term-by-term matrix. The rows and columns in FIG. 17 may, or may not, depict the entire term-by-term matrix for the example discussed in connection with FIG. 16. In this example term-by-term matrix, occurrences between terms are documented. Terms in the column "Term" indicate a reference term. Terms listed in each of the remaining columns indicate the other terms in the document. In the current example, a single occurrence of a term within the maximum distance threshold of the reference term may be expressed with a "1" while multiple occurrences of the term may be expressed with a number representing the number of occurrences.

As discussed above, not all entries in the term-by-term matrix may be populated. For example, depending on the maximum distance threshold, some distances corresponding to a particular row/column combination may not be calculated (e.g., if the terms are located at a distance that exceeds the maximum distance threshold). Additionally, or alternatively, one or more row/column combinations may be deleted, or otherwise ignored, after the occurrences for such combinations have been calculated.

Thus, in the continuing example, taxonomy automation engine 102 may determine that the pairing of terms "corner" (row) and "eye" (column) occur once within the maximum distance threshold, while the pairing "complex" (row) and "emotion" occur twice within the maximum distance threshold.

FIG. 18 depicts an example proximity weighting scheme. As discussed above, a proximity weighting scheme may be a linear function, a collection of rules, or any suitable means for assigning a weight value to a distance measurement. A proximity weight scheme may specify that certain types of terms be weighted more heavily than others. For example, nouns may be weighted more heavily than adjectives or vice versa.

FIG. 18A depicts an example proximity weighting scheme. In the proximity weight scheme of FIG. 18A, the weight corresponding to the distance proportionally decreases as the distance between terms increases. For example, a term that is located one sentence away (either before or after the reference term) may have a score that is weighted by 0.8. Likewise, a term that is located two sentences away (either before or after the reference term) bay have a score that is weighted by 0.6. Thus, for each additional sentence between the term and the reference term, the weight may decrease by 0.2 until a distance of five sentences is reached. At five sentences, or another suitable distance, the weight may be 0. A weight of 0 may have the effect that the term has no score, or a score of 0. Terms with scores of 0 may be ignored and/or discarded from future consideration as a potential classifiers. One or more additional rules may be associated with the proximity weighting scheme of FIG. 18A. For example, rules defining different weights between term types (noun vs. adjective, etc.) may be included.

FIG. 18B depicts an additional example of a proximity weighting scheme. In the proximity weight scheme of FIG. 18B, the weight corresponding to the distance decreases according to the distance between the term and the reference term. For example, a term that is located one sentence away (either before or after the reference term) may have a score that is weighted by 0.9. A term that is located two sentences after the reference term may have a score that is weighted by 0.7, while a term that is located two sentences before the reference term may have a different weight (e.g., 0.45). In some cases, terms that occur after the reference term may be weighting more heavily than terms that occur before the reference term. Thus, the weights may be applied to the scores of each term according to the proximity weighting scheme 18B. As discussed with respect to FIG. 18A, a weight of 0 may cause a term to be ignored and/or discarded from future consideration as a potential classifiers. One or more additional rules may be associated with the proximity weighting scheme of FIG. 18B in a similar manner as discussed in FIG. 18A. Any number of proximity weighting schemes may be considered, FIGS. 18A and 18B are intended to be non-limiting examples.

FIG. 19 depicts an example proximity-weighted term-by-term matrix. As a non-limiting example, consider the example of FIGS. 16 and 17 is continued. That is, the text 1602 has been parsed and various parts of speech removed (e.g., such as at 1604 of FIG. 16). The maximum distance threshold has been determined (e.g., at 1606 of FIG. 16). Given a distance threshold of two sentences, a first term is determine from the data set (e.g., "corner"). A number of occurrences may be determined for other terms in the document with respect to the current reference term "corner." Such occurrences may be document in the term-by-term matrix of FIG. 17. Specifically, such occurrences may be documents in the row starting with the term "corner."

For each occurrence documented in FIG. 17, a proximity weighting scheme (e.g., the proximity weighting scheme of FIG. 18A) may be consulted to determine a corresponding weight to apply. For example, "eye," and "frog's" occur once within a same sentence as "corner" and do not occur again within the text. Accordingly, each of the terms "eye," and "frog's" can receive a score of 1.0 which equates to a count of 1 (occurrence) multiplied by a weight of 1 (within a same sentence as the reference term).

Continuing with the example, the term "face" occurs once, one sentence away from the reference term "corner," and does not occur again within the text. Thus, "face" receives a score of 0.8 which equates to a count of 1 occurrence multiplied by a weight of 0.8 according to the proximity weighting scheme of FIG. 18A.

Continuing with the example, the term "emotion" occurs twice within the maximum distance threshold. Once, within the same sentence as the reference term, and a second time, one sentence away. Thus, "face" receives a score of 1.8 which equates to a count of 1 occurrence multiplied by a weight of 1.0, added to a count of 1 occurrence multiplied by a weight of 0.8 (e.g., (1×1.0)+(1×0.8)) according to the proximity weighting scheme of FIG. 18A.

Continuing with the example, the terms "jewel" and "Xcorp" may, in this example, be ignored as they occur outside the maximum distance threshold.

Each entry of the term-by-term matrix depicted in FIG. 17 may be processed (in parallel or serially) and adjusted according to the proximity weighting scheme of FIG. 18A resulting in the proximity weighted term-by-term matrix of FIG. 19.

Figure 20:
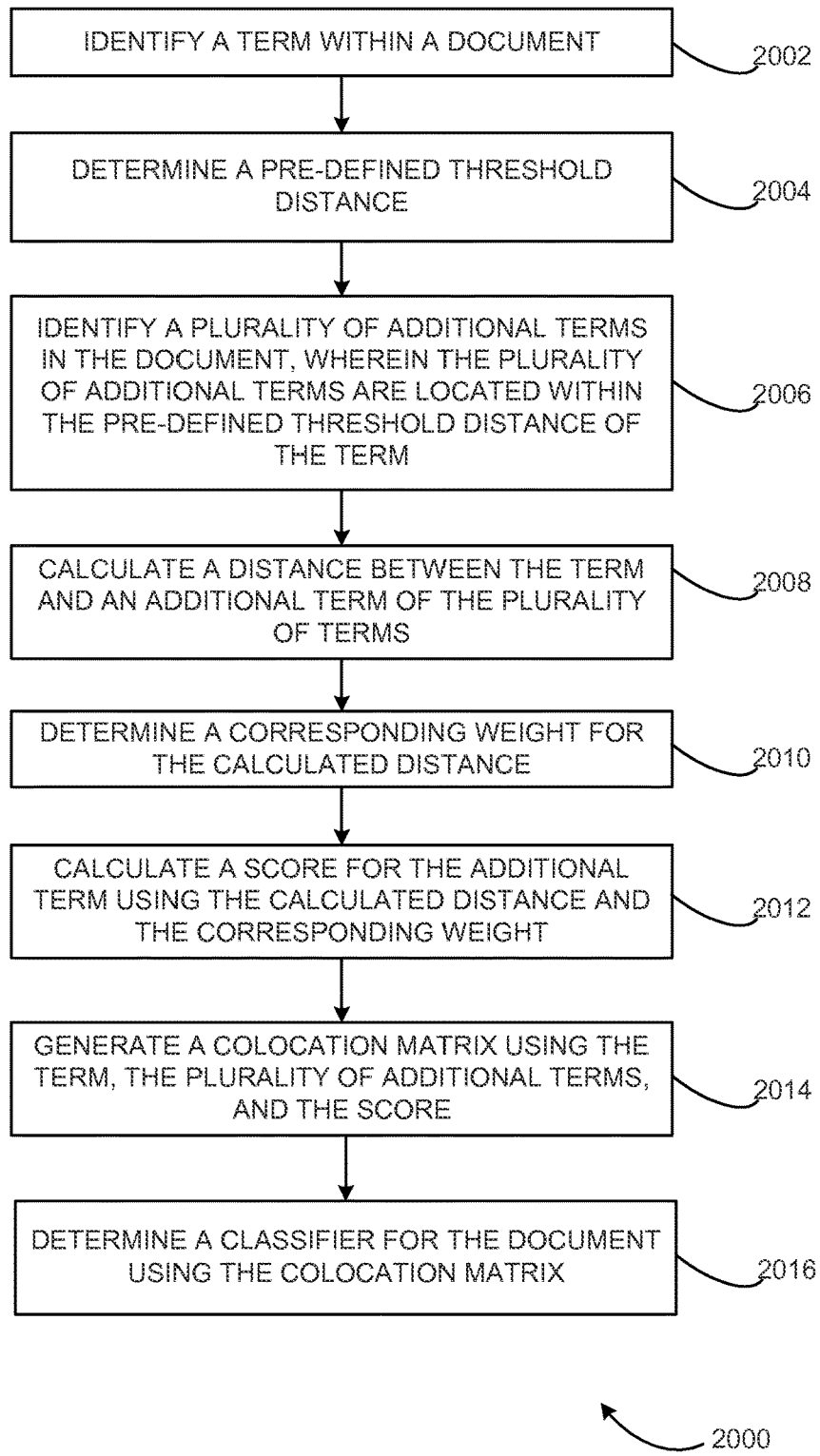
FIG. 20 depicts an example process for determining a classifier for a document using a colocation matrix and a proximity weighting scheme.

FIG. 20 depicts an example process 2000 for determining a classifier for a document using a colocation matrix and a proximity weighting scheme (e.g., a proximity weighting scheme of FIG. 18A or 18B).

The process 2000 may begin at 2002 where a term may be identified within a document (e.g., a document of the collection of documents 502). Terms may be processed sequentially, or in any suitable manner. All terms may be identified within the document, or a subset of terms may be identified within the document or within multiple documents. Identified terms may, in some cases, be added to a data set (e.g., the keys data set of FIG. 5).

At 2004, a pre-defined threshold distance (e.g., the maximum distance threshold discussed above) may be determined.

At 2006, a plurality of additional terms may be identified in the document. In at least one embodiment, the plurality of additional terms may be located with the pre-defined threshold distance (e.g., the maximum distance threshold of FIG. 5) of the term. In at least one example, taxonomy automation engine 102 may access stored data (e.g., configuration data)

that specifies the maximum distance threshold. It should be understood that the threshold distance is not required to be pre-defined and can instead by user-defined (e.g., at runtime).

At 2008, a distance between the term (e.g., a reference term) and an additional term of the plurality of terms may be calculated. Such distances may be subject to the pre-defined threshold distance. For example, any terms that fall within the pre-defined threshold distance may have distances calculated, while distances for terms located outside the pre-defined threshold distance may not be calculated.

At 2010, a corresponding weight for the calculated distance may be determined. A corresponding weight may be determined by consulting a proximity weighting scheme (e.g., the proximity weighting schemes of FIGS. 18A and 18B). One or more rules related to one or more proximity weighting schemes may be utilized when calculated the corresponding weight for one or more distances between an additional term and a reference term.

At 2012, a score may be calculated for the additional term using the calculated distance and the corresponding weight. For example, a number of occurrences may each receive an initial score. Each initial score may be weighted according to the proximity weighting scheme and the weighted scores added together (as described with respect to FIG. 19).

At 2014, a colocation matrix may be generated using the term, the plurality of additional terms, and the score. The colocation matrix may be in a same, or similar format as FIG. 19.

At 2016, a classifier for the document may be determined using to the colocation matrix. For example, the colocation matrix of process 2000 may be utilized in a similar manner as described above with regards to using a clustering operation. For example, a clustering operation may be performed as described above to select classifiers for a particular attribute. The clustering operation may identify terms (words) in the colocation matrix, containing the candidate classifiers, that are related to a selected term. In practice, the selected term is often a particular attribute for which one seeks to identify classifiers. A row in the colocation matrix containing the selected word may be identified as a seed row. Cluster distance calculations, such as Euclidean distance calculations, are performed between each row in the colocation matrix and the seed row. Rows having small distances likely contain words that are closely related to the particular attribute. Thus, a set of classifiers can be generated by selecting words from rows that have distance metric values that are small, such as those having distance metric values within a threshold distance from the seed row.

FIGS. 21A and 21B depicts a classifier clustering data structure. The rows are associated with different seed words chosen as being related to attributes for which related classifiers are desired. The values represent distance metrics (e.g., Euclidean distances) between the seed row of the attribute and the candidate classifier row from the colocation metric. A dummy seed row that includes an equal distribution of all of the top n candidate clusters may be used to capture noise. Smaller values in the table of FIGS. 21A and 21B identify smaller distances, and thus higher perceived relatedness between a seed row and a candidate classifier.

FIG. 22 is a table identifying distances between a seed word and a number of candidate classifiers. The seed word, culture, may be an attribute for which classifiers are sought. Distance metric values range from between 26 and 56. If the threshold for selecting a candidate classifier for the set of classifiers is 45, then Culture, company culture, employee, emphasis, core, long term, hire, and belief are selected for the set of classifiers.

Synonyms for terms selected for the set of classifiers may also be included in the set of classifiers (e.g., include "worker" based on the selection of employee for the set of classifiers). FIG. 23 depicts an example operation to determine the similarity between a word selected for the set of classifiers and a synonym to determine whether to include the synonym in the set of classifiers. A Wordnet relational database is used to identify synonyms for words selected for the set of classifiers. A similarity is measured between a classifier assigned to an attribute and an unassigned classifier. Based on the similarity and potentially other factors (e.g., the distance determined between the particular attribute and the attribute selected for the set), a decision is made as to whether to include the synonym in the set of classifiers. For example, the similarity required to retain a synonym for the set of classifiers may be less when the selected classifier is determined to be very close to the particular attribute's colocation matrix row.

Figure 24A:
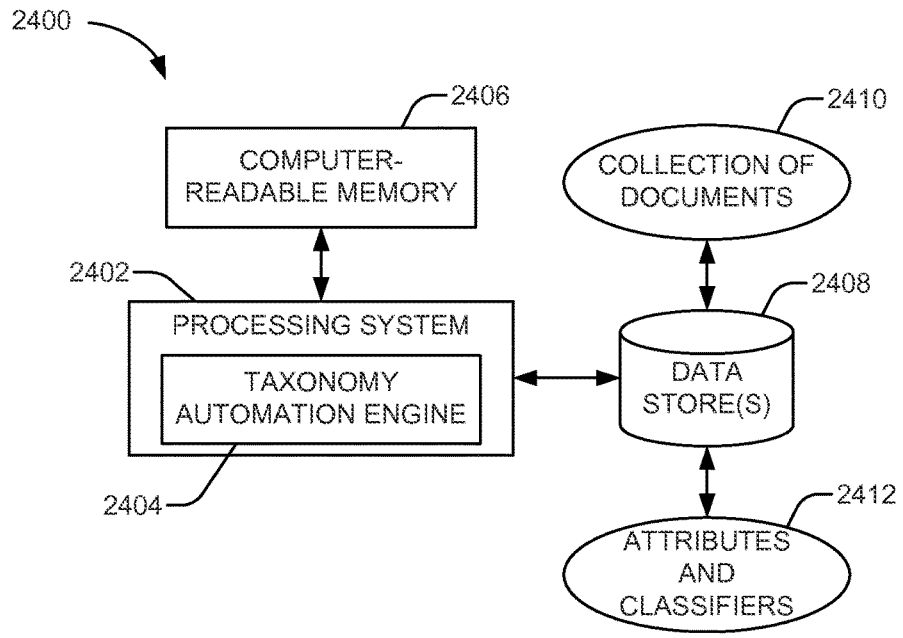
FIGS. 24A, 24B, and 24C depict example systems for use in implementing a taxonomy automation engine.
Figure 24B:
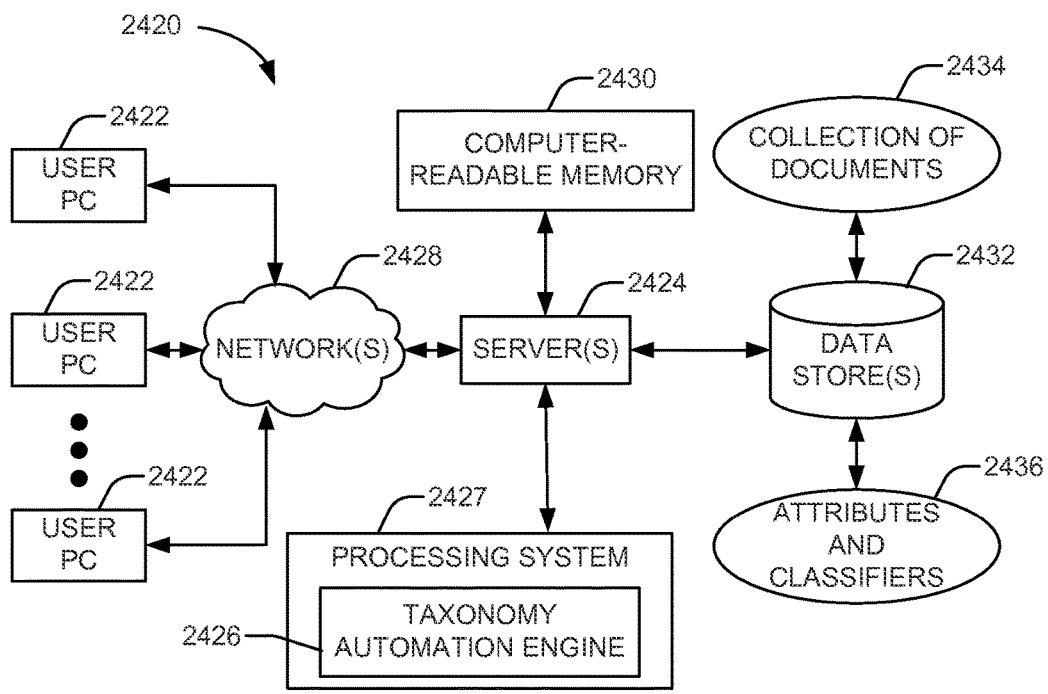
Figure 24C:
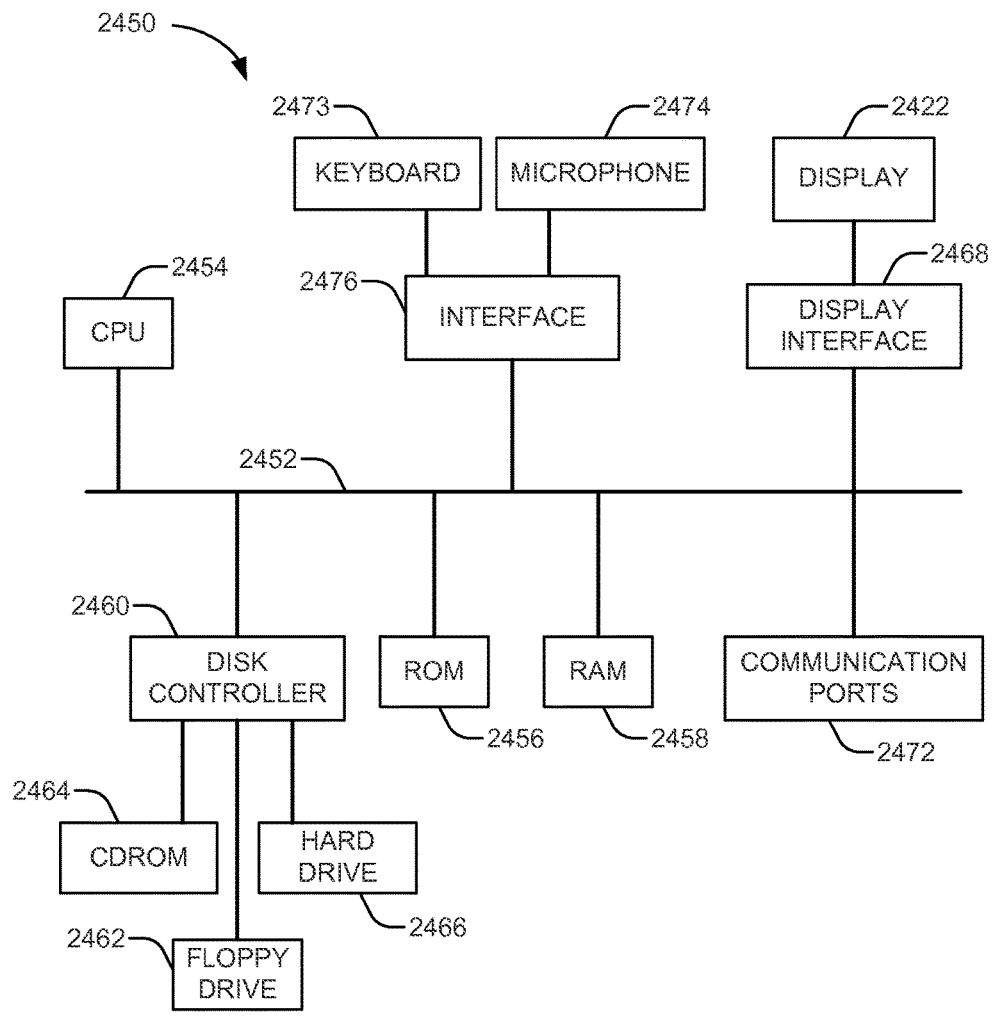

FIGS. 24A, 24B, and 24C depict example systems for use in implementing a taxonomy automation engine. For example, FIG. 24A depicts an exemplary system 2400 that includes a standalone computer architecture where a processing system 2402 (e.g., one or more computer processors located in a given computer or in multiple computers that may be separate and distinct from one another) includes a taxonomy automation engine 2404 being executed on it. The processing system 2402 has access to a computer-readable memory 2406 in addition to one or more data stores 2408. The one or more data stores 2408 may include a collection of documents 2410 as well as attribute and classifier data 2412.

FIG. 24B depicts a system 2420 that includes a client server architecture. One or more user PCs 2422 access one or more servers 2424 running a taxonomy automation engine 2426 on a processing system 2427 via one or more networks 2428. The one or more servers 2424 may access a computer readable memory 2430 as well as one or more data stores 2432. The one or more data stores 2432 may contain a collection of documents 2434 as well as attribute and classifier data 2436.

FIG. 24C shows a block diagram of exemplary hardware for a standalone computer architecture 2450, such as the architecture depicted in FIG. 24A that may be used to contain and/or implement the program instructions of system embodiments of the present invention. A bus 2452 may serve as the information highway interconnecting the other illustrated components of the hardware. A processing system 2454 labeled CPU (central processing unit) (e.g., one or more computer processors at a given computer or at multiple computers), may perform calculations and logic operations required to execute a program. A processor-readable storage medium, such as read only memory (ROM) 2456 and random access memory (RAM) 2458, may be in communication with the processing system 2454 and may contain one or more programming instructions for performing the method of implementing a taxonomy automation engine. Optionally, program instructions may be stored on a non-transitory computer readable storage medium such as a magnetic disk, optical disk, recordable memory device, flash memory, or other physical storage medium.

A disk controller 2460 interfaces one or more optional disk drives to the system bus 2452. These disk drives may be external or internal floppy disk drives such as 2462, external or internal CD-ROM, CD-R, CD-RW or DVD drives such as 2464, or external or internal hard drives 2466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 2460, the ROM 2456 and/or the RAM 2458. Preferably, the processor 2454 may access each component as required.

A display interface 2468 may permit information from the bus 2452 to be displayed on a display 2470 in audio, graphic, or alphanumeric format. Communication with external devices may optionally occur using various communication ports 2472.

In addition to the standard computer-type components, the hardware may also include data input devices, such as a keyboard 2473, or other input device 2474, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A system, comprising:
   one or more processors;
   one or more non-transitory computer readable storage mediums containing instructions to cause the one or more processors to perform operations including:
   for each term of a plurality of terms within a document:
   identifying the term within the document;
   determining a pre-defined threshold distance;
   identifying a plurality of additional terms in the document, wherein the plurality of additional terms are located within the pre-defined threshold distance of the term;
   for each additional term of the plurality of additional terms:
   calculating a distance between the term and the additional term;
   determining a corresponding weight for the calculated distance, wherein determining the corresponding weight uses a proximity weighting scheme without using one or more topic terms or sentiment words; and
   calculating a score for the additional term using the calculated distance and the corresponding weight;
   generating a colocation matrix including a plurality of rows, wherein the colocation matrix is generated using the plurality of terms within the document, the plurality of additional terms within the document, and the calculated scores, wherein different rows in the colocation matrix represent different terms of the plurality of terms and include calculated scores for the plurality of additional terms; and
   determining a classifier for the document using the colocation matrix.

2. The system of claim 1, wherein the calculated distance corresponds to a number of sentences from the term.

3. The system of claim 1, wherein the proximity weighting scheme includes a decaying weight value, and wherein the decaying weight value decreases as the distance between the term and the additional term increases.

4. The system of claim 1, wherein the operations further include:
   sorting the plurality of rows of the colocation matrix to generate an ordered colocation matrix, wherein the sorting is according to a corresponding distance between the additional term and the term; and
   determining a set of candidate classifiers using the colocation matrix, wherein the classifier is determined from the set of candidate classifiers.

5. The system of claim 1, wherein the operations further include:
   standardizing each of the plurality of rows by dividing values in each row by a sum of values in the row.

6. The system of claim 1, wherein the operations further include:
   identifying a seed row of the plurality of rows, wherein the seed row is associated with a particular term within the document;

determining a distance metric by comparing rows of the colocation matrix to the seed row using a clustering operation; and generating a set of candidate classifiers for the particular term, wherein the set of candidate classifiers are determined using the distance metrics, and wherein the classifier is determined from the set of candidate classifiers.

7. The system of claim 6, wherein the distance metric for a particular candidate classifier of the set of candidate classifiers is determined based on a Euclidean distance calculation using values from a row in the colocation matrix and corresponding values in the seed row in the colocation matrix.

8. The system of claim 6, wherein candidate classifiers having corresponding distance metrics within a distance threshold are selected for inclusion in the set of candidate classifiers for the particular term.

9. The system of claim 6, wherein the set of candidate classifiers is provided to a downstream computer for processing.

10. The system of claim 6, wherein the set of candidate classifiers is limited to nouns, verbs, or adjectives.

11. The system of claim 1, wherein the operations further include:

identifying a plurality of other terms within the document;

for an individual term of the plurality of other terms:

identifying one or more of the plurality of other terms that occur within the pre-defined threshold distance of the individual term;

calculating a new distance measurement between the individual term and another term of the plurality of other terms;

determining a new weight for the new distance measurement, wherein determining the new weight uses the proximity weighting scheme; and calculating a new score for the other term using the distance measurement and the associated weight.

12. The system of claim 1, wherein the colocation matrix indicates how often different terms within the document occur within the pre-defined threshold distance of one another.

13. The system of claim 1, wherein the system further comprises a display interface in data communication with the one or more processors, and wherein the operations further include:

outputting the classifier for the document using the display interface.

14. A computer program product, tangibly embodied in a non-transitory machine readable storage medium, including instructions operable to cause a data processing apparatus to perform operations including:

for each term of a plurality of terms within a document:

identifying the term within the document;

determining a pre-defined threshold distance;

identifying a plurality of additional terms in the document, wherein the plurality of additional terms are located within the pre-defined threshold distance of the term; and for each additional term of the plurality of additional terms:

calculating a distance between the term and the additional term;

determining a corresponding weight for the calculated distance, wherein determining the corresponding weight uses a proximity weighting scheme without using one or more topic terms or sentiment words; and calculating a score for the additional term using the calculated distance and the corresponding weight;

generating a colocation matrix including a plurality of rows, wherein the colocation matrix is generated using the plurality of terms within the document, the plurality of additional terms within the document, and the calculated scores, wherein different rows in the colocation matrix represent different terms of the plurality of terms and include calculated scores for the plurality of additional terms; and determining a classifier for the document using the colocation matrix.

15. The computer program product of claim 14, wherein the calculated distance corresponds to a number of sentences from the term.

16. The computer program product of claim 14, wherein the proximity weighting scheme includes a decaying weight value, and wherein the decaying weight value decreases as the distance between the term and the additional term increases.

17. The computer program product of claim 14, wherein the operations further include:

sorting the plurality of rows of the colocation matrix to generate an ordered colocation matrix, wherein the sorting is according to a corresponding distance between the additional term and the term; and determining a set of candidate classifiers using the colocation matrix, wherein the classifier is determined from the set of candidate classifiers.

18. The computer program product of claim 14, wherein the operations further include:

standardizing each of the plurality of rows by dividing values in each row by a sum of values in the row.

19. The computer program product of claim 14, wherein the operations further include:

identifying a seed row of the plurality of rows, wherein the seed row is associated with a particular term within the document;

determining a distance metric by comparing rows of the colocation matrix to the seed row using a clustering operation; and generating a set of candidate classifiers for the particular term, wherein the set of candidate classifiers are determined using the distance metrics, and wherein the classifier is determined from the set of candidate classifiers.

20. The computer program product of claim 19, wherein the distance metric for a particular candidate classifier of the set of candidate classifiers is determined based on a Euclidean distance calculation using values from a row in the colocation matrix and corresponding values in the seed row in the colocation matrix.

21. The computer program product of claim 19, wherein candidate classifiers having corresponding distance metrics within a distance threshold are selected for inclusion in the set of candidate classifiers for the particular term.

22. The computer program product of claim 19, wherein the set of candidate classifiers is provided to a downstream computer for processing.

23. The computer program product of claim 19, wherein the set of candidate classifiers is limited to nouns, verbs, or adjectives.

24. The computer program product of claim 14, wherein the operations further include:

identifying a plurality of other terms within the document;
for an individual term of the plurality of other terms:
  identifying one or more of the plurality of other terms that occur within the pre-defined threshold distance of the individual term;
  calculating a new distance measurement between the individual term and another term of the plurality of other terms;
  determining a new weight for the new distance measurement, wherein determining the new weight uses the proximity weighting scheme; and
  calculating a corresponding new score for the other term using the distance measurement and the associated weight.

25. The computer program product of claim 14, wherein the colocation matrix indicates how often different terms within the document occur within the pre-defined threshold distance of one another.

26. The computer program product of claim 14, wherein the operations further include:
  outputting the classifier for the document using a display interface of the data processing apparatus.

27. A computer-implemented method comprising:
for each term of a plurality of terms within a document:
  identifying the term within the document;
  determining a pre-defined threshold distance;
  identifying a plurality of additional terms in the document, wherein the plurality of additional terms are located within the pre-defined threshold distance of the term; and
  for each additional term of the plurality of additional terms:
    calculating a distance between the term and the additional term;
    determining a corresponding weight for the calculated distance, wherein determining the corresponding weight uses a proximity weighting scheme without using one or more topic terms or sentiment words; and
    calculating a score for the additional term using the calculated distance and the corresponding weight;
  generating a colocation matrix including a plurality of rows, wherein the colocation matrix is generated using the plurality of terms within the document, the plurality of additional terms within the document, and the calculated scores, wherein different rows in the colocation matrix represent different terms of the plurality of terms and include calculated scores for the plurality of additional terms; and
determining a classifier for the document using the colocation matrix.

28. The computer-implemented method of claim 27, wherein the calculated distance corresponds to a number of sentences from the term.

29. The computer-implemented method of claim 27, wherein the proximity weighting scheme includes a decaying weight value, and wherein the decaying weight value decreases as the distance between the term and the additional term increases.

30. The computer-implemented method of claim 27, further comprising:
  sorting the plurality of rows of the colocation matrix to generate an ordered colocation matrix, wherein the sorting is according to a corresponding distance between the additional term and the term; and
  determining a set of candidate classifiers using the colocation matrix, wherein the classifier is determined from the set of candidate classifiers.

31. The computer-implemented method of claim 27, further comprising:
  standardizing each of the plurality of rows by dividing values in each row by a sum of values in the row.

32. The computer-implemented method of claim 27, further comprising:
  identifying a seed row of the plurality of rows, wherein the seed row is associated with a particular term within the document;
  determining a distance metric by comparing rows of the colocation matrix to the seed row using a clustering operation; and
  generating a set of candidate classifiers for the particular term, wherein the set of candidate classifiers are determined using the distance metrics, and wherein the classifier is determined from the set of candidate classifiers.

33. The computer-implemented method of claim 32, wherein the distance metric for a particular candidate classifier of the set of candidate classifiers is determined based on a Euclidean distance calculation using values from a row in the colocation matrix and corresponding values in the seed row in the colocation matrix.

34. The computer-implemented method of claim 32, wherein candidate classifiers having corresponding distance metrics within a distance threshold are selected for inclusion in the set of candidate classifiers for the particular term.

35. The computer-implemented method of claim 32, wherein the set of candidate classifiers is provided to a downstream computer for processing.

36. The computer-implemented method of claim 32, wherein the set of candidate classifiers is limited to nouns, verbs, or adjectives.

37. The computer-implemented method of claim 27, further comprising:
  identifying a plurality of other terms within the document;
  for an individual term of the plurality of other terms:
    identifying one or more of the plurality of other terms that occur within the pre-defined threshold distance of the individual term;
    calculating a new distance measurement between the individual term and another term of the plurality of other terms;
    determining a new weight for the new distance measurement, wherein determining the new weight uses the proximity weighting scheme; and
    calculating a corresponding new score for the other term using the distance measurement and the associated weight.

38. The computer-implemented method of claim 27, wherein the colocation matrix indicates how often different terms within the document occur within the pre-defined threshold distance of one another.

39. The computer-implemented method of claim 27, further comprising:
  outputting the classifier for the document using a display interface.

* * * * *